United States Patent
Imamura

(10) Patent No.: US 9,729,773 B2
(45) Date of Patent: Aug. 8, 2017

(54) INTERCHANGEABLE LENS DIGITAL CAMERA

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 14/854,988

(22) Filed: Sep. 15, 2015

(65) Prior Publication Data

US 2016/0006923 A1    Jan. 7, 2016

Related U.S. Application Data

(63) Continuation of application No. PCT/JP2014/054635, filed on Feb. 26, 2014.

(30) Foreign Application Priority Data

Mar. 27, 2013  (JP) ................................. 2013-066285

(51) Int. Cl.
*H04N 5/253* (2006.01)
*H04N 5/232* (2006.01)
(Continued)

(52) U.S. Cl.
CPC ........... *H04N 5/23209* (2013.01); *G03B 5/00* (2013.01); *G03B 17/14* (2013.01); *H04N 5/2329* (2013.01);
(Continued)

(58) Field of Classification Search
None
See application file for complete search history.

(56) References Cited

U.S. PATENT DOCUMENTS 6,822,684 B1    11/2004  Suzuki et al.
2003/0007075 A1*  1/2003  Masuda ............. H04N 5/23209
                                                      348/208.11
(Continued)

FOREIGN PATENT DOCUMENTS

JP    2000-032324 A    1/2000
JP    2007-052235 A    3/2007
(Continued)

OTHER PUBLICATIONS

International Search Report issued in PCT/JP2014/054635 dated Apr. 8, 2014.
(Continued)

*Primary Examiner* — Roberto Velez
*Assistant Examiner* — Stephen Coleman
(74) *Attorney, Agent, or Firm* — Birch, Stewart, Kolasch & Birch, LLP

(57) ABSTRACT

Provided is an interchangeable lens digital camera that is capable of correcting a rolling shutter distortion in a live view image without delay in displaying the image. At the start of live view imaging, a lens controller in an interchangeable lens controls a shake detection sensor to detect the direction and amount of a shake, and produces deviation information on the basis of shake detection signals from the shake detection sensor, the deviation information indicating fluctuation in direction and amount of the shake for one frame of the live view image in the form of a parameter. The deviation information is transmitted to a body controller of a camera body through a serial communication unit, to correct the rolling shutter distortion on the basis of the deviation information.

13 Claims, 29 Drawing Sheets

(51) Int. Cl.
 *G03B 5/00* (2006.01)
 *G03B 17/14* (2006.01)
(52) U.S. Cl.
 CPC ..... *H04N 5/23212* (2013.01); *H04N 5/23251* (2013.01); *H04N 5/23258* (2013.01); *G03B 2206/00* (2013.01); *G03B 2217/005* (2013.01)

(56) References Cited

U.S. PATENT DOCUMENTS

| | | | |
|---|---|---|---|
| 2006/0082656 A1* | 4/2006 | Ochiai | H04N 5/23248 348/207.99 |
| 2012/0038818 A1* | 2/2012 | Hamada | H04N 5/23212 348/349 |

FOREIGN PATENT DOCUMENTS

| | | |
|---|---|---|
| JP | 2011-103631 A | 5/2011 |
| JP | 2012-080490 A | 4/2012 |

OTHER PUBLICATIONS

Written Opinion of the International Searching Authority issued in PCT/JP2014/054635 dated Apr. 8, 2014 (PCT/ISA/237).

* cited by examiner

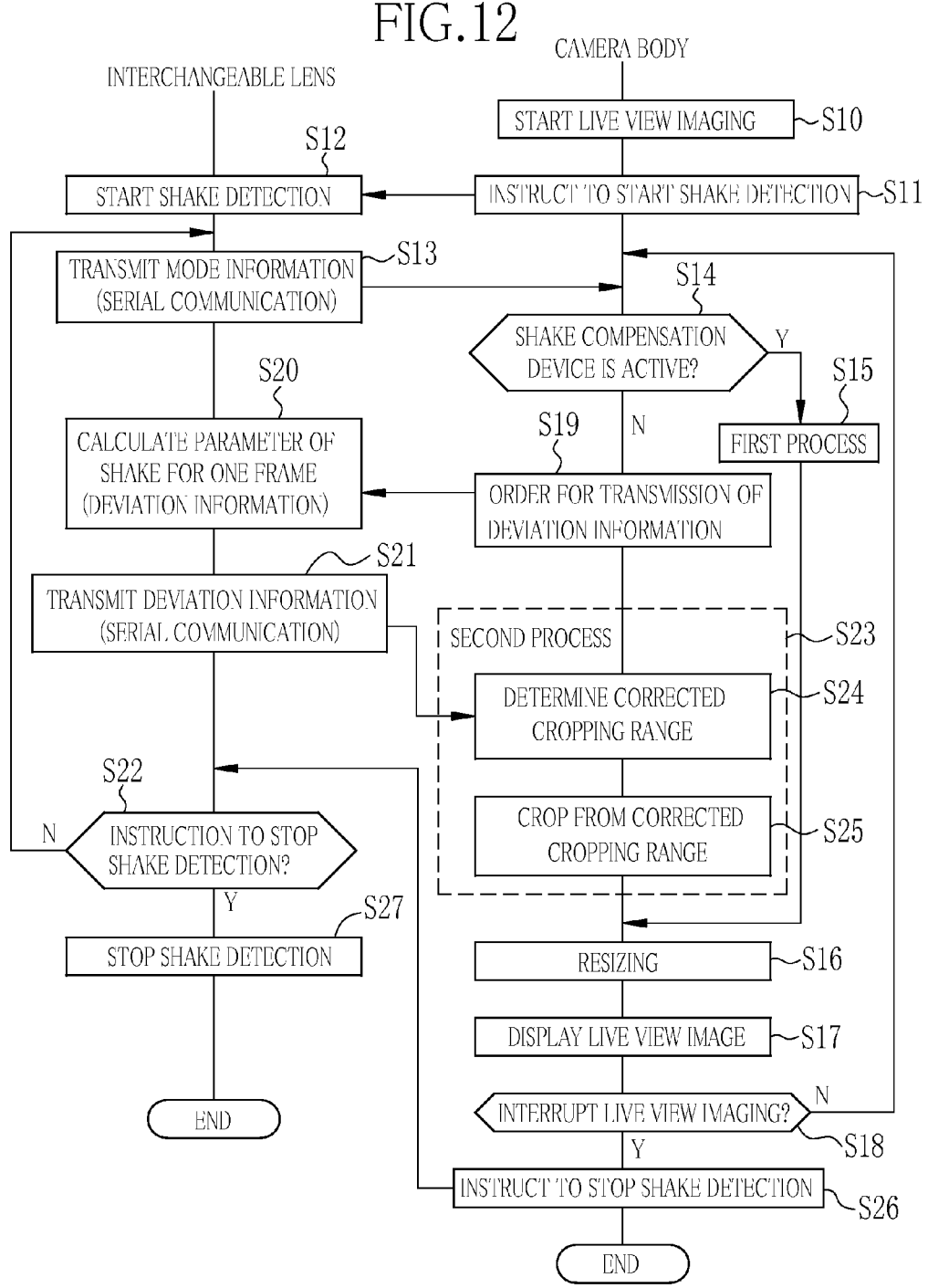

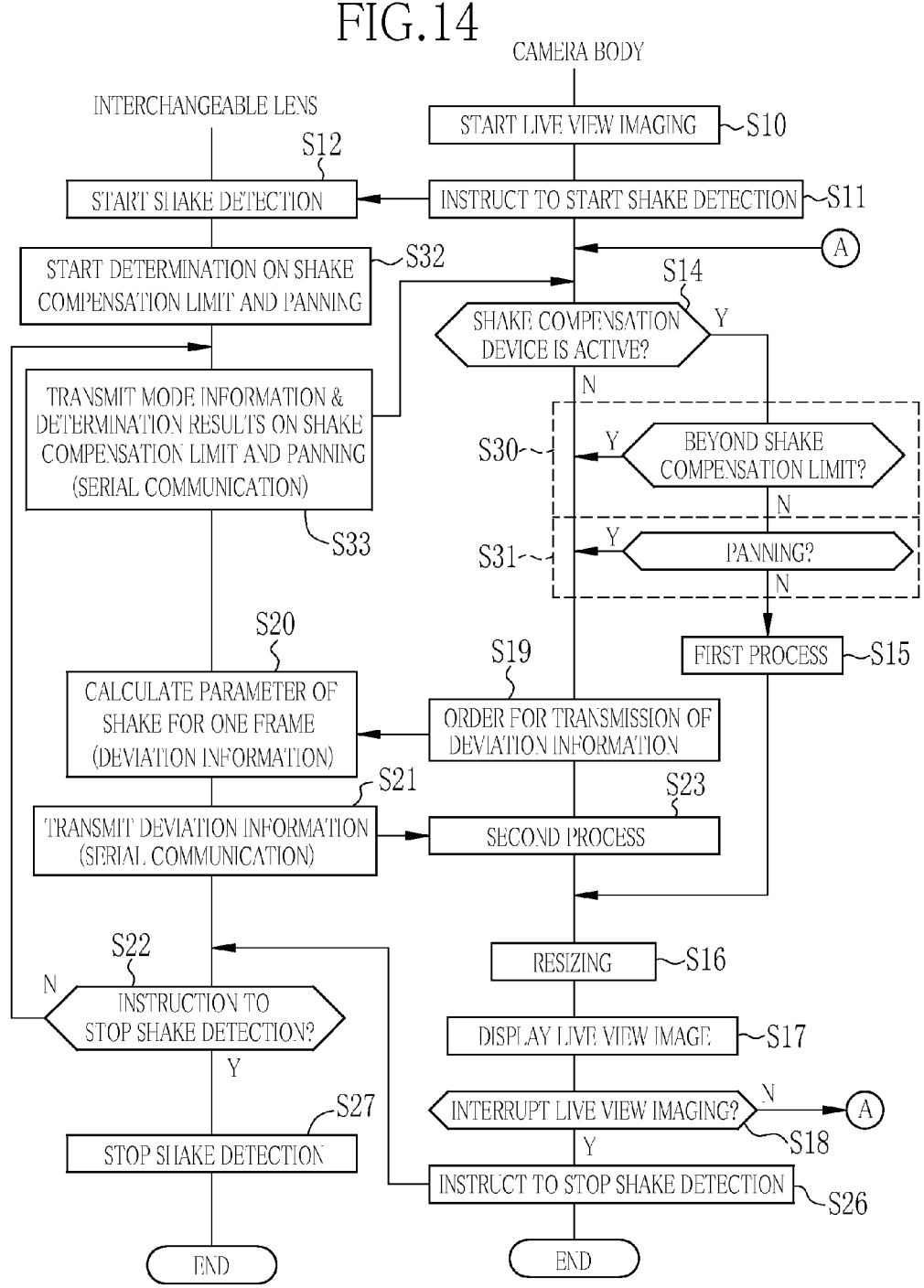

FIG.26
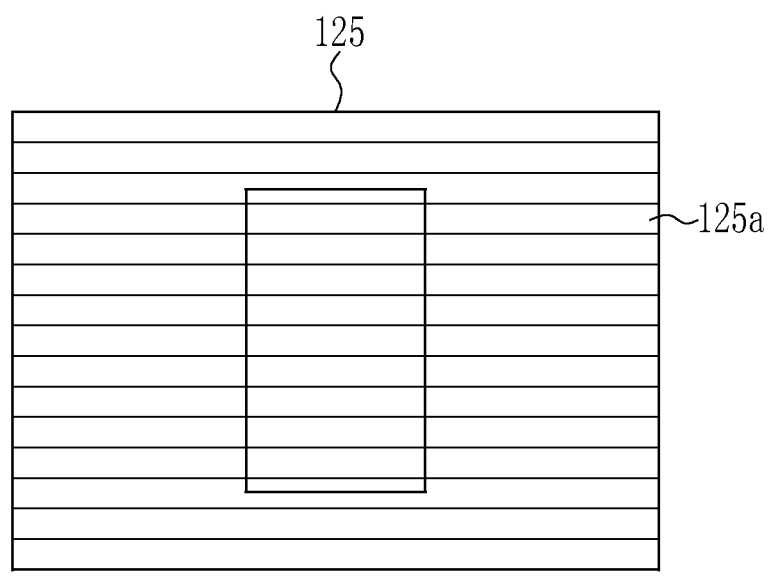
(A)
RESIZING (REDUCTION)
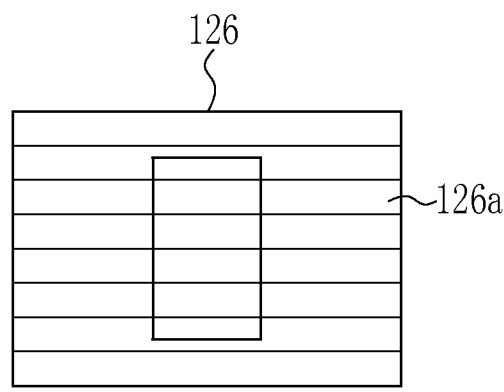
(B)

FIG.27
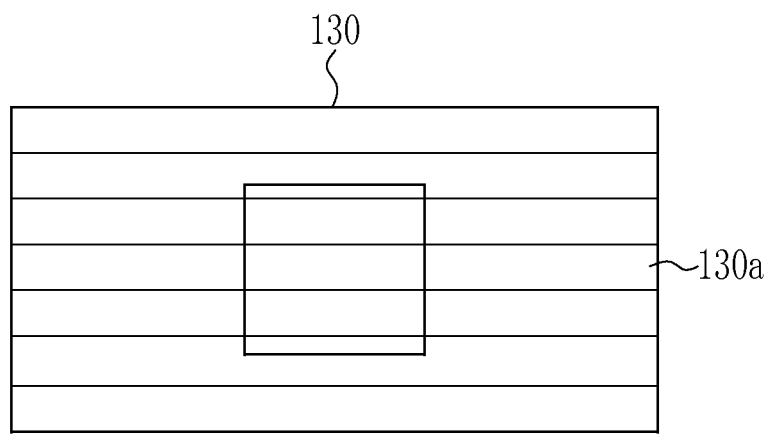
(A)
⇩ RESIZING
(SCANNING LINE
INTERPOLATION)
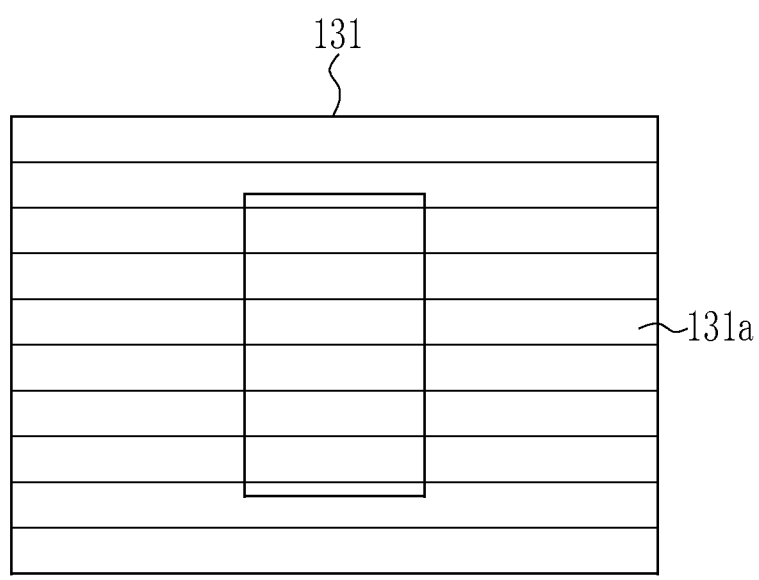
(B)

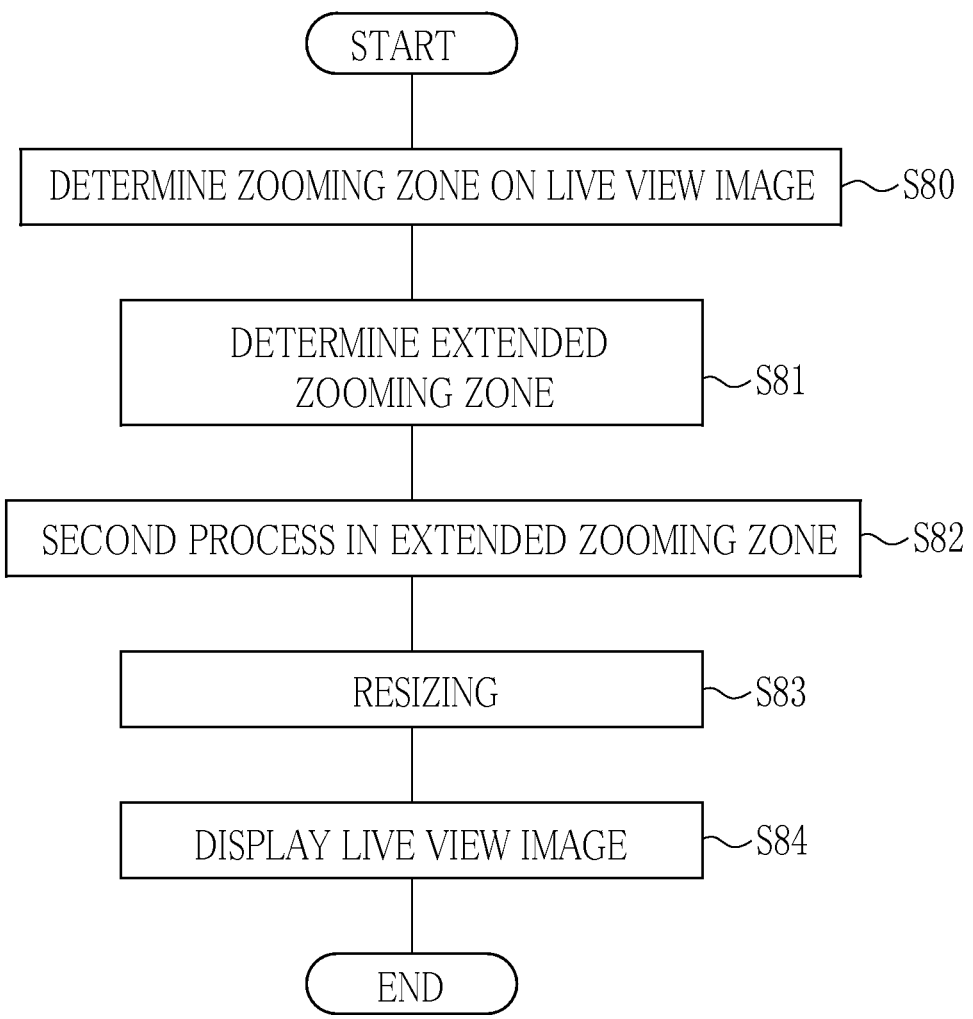

INTERCHANGEABLE LENS DIGITAL CAMERA

CROSS-REFERENCE TO RELATED APPLICATIONS

This application is a Continuation of PCT International Application No. PCT/JP2014/054635 filed on Feb. 26, 2014, which claims priority under 35 U.S.C §119(a) to Japanese Patent Application No. 2013-066285 filed Mar. 27, 2013. The above application is hereby expressly incorporated by reference, in its entirety, into the present application.

BACKGROUND OF THE INVENTION

1. Field of the Invention

The present invention relates to an interchangeable lens digital camera.

2. Description Related to the Prior Art

As an image sensor mounted in a digital camera, a CMOS (complementary metal oxide semiconductor) type image sensor is known. Compared to CCD image sensors, CMOS type image sensors (hereinafter referred to as CMOS sensors) have conventionally been more affected by noises and inferior in image quality. However, recent various improvements provide CMOS sensors with higher image quality enough for employing the CMOS sensors in interchangeable lens digital cameras which are generally used for acquisition of high-quality images. An interchangeable lens digital camera consists of a camera body and interchangeable lenses which are each detachably attachable to the camera body, enabling an imaging with one interchangeable lens that accords with the purpose of the imaging. These interchangeable lens digital cameras include those called a single-lens reflex camera and a mirror-less single-lens reflex camera.

The CMOS sensor has a plurality of pixels (photodiodes) arranged in a two dimensional array, each pixel accumulating signal charges according to the exposure amount thereof. Each pixel of the CMOS sensor starts accumulating the signal charges right after being reset. The signal charges accumulated in the pixels are read out after the elapse of a predetermined exposure time, and are converted to voltages to be output as a pixel signal. As an exposure method for the CMOS sensor having this configuration, a rolling shutter method is employed. According to the rolling shutter method, a sequence of operations consisting of resetting and exposing the pixels and reading out the pixel signal are executed sequentially from one scanning line to another at the timing shifted from each other, the scanning line being a line of pixels aligned in the horizontal direction. The timing of each sequence may be shifted from pixel to pixel or in the unit of a number of scanning lines.

The abovementioned rolling shutter method enables high-speed successive imaging and contributes to reducing power consumption. However, because of the difference in exposure timing between the pixels or between the scanning lines, the image captured according to the rolling shutter method may have a distortion called rolling shutter distortion if the digital camera sways during the imaging due to camera shake, panning or the like, or if the subject moves during the imaging.

JPA No. 2012-080490 and JPA No. 2011-103631 disclose digital cameras which are provided with a capability of correcting the rolling shutter distortion. The digital camera in JPA No. 2012-080490 is provided with a CMOS sensor, an image data processor consisting of a calculator section calculating the displacement of a subject image between adjacent scanning lines, and a corrector section correcting the rolling shutter distortion on the basis of the calculation result. The calculator section divides each scanning line into multiple blocks and obtains the degree of correlation between the image signals from one block of one scanning line and another block of the adjacent scanning line. On the basis of the correlation degree, the calculator section detects a subject image that is moving relatively to an imaging plane of the CMOS sensor, and calculates the displacement of the subject image. The corrector section corrects the rolling shutter distortion by moving the detected subject image in accordance with the displacement between the scanning lines.

The digital camera disclosed in JPA No. 2011-103631 is provided with a shake compensation device consisting of a shake detection sensor which detects the camera shake and the panning, and a shake compensating section which moves the image sensor or a compensation lens on the basis of the detection result obtained by the shake detection sensor. When the shake detection sensor detects the camera shake, the shake compensating section makes an operation to compensate for the camera shake. When the shake detection sensor detects the panning, the shake compensating section makes a compensative operation for correcting the rolling shutter distortion. Note that the panning is an operation of turning the camera in the horizontal direction, for example, for the purpose of tracking and shooting a moving subject.

Some digital cameras have a capability of displaying images taken through an image sensor sequentially on an image display unit, i.e., so-called the live view function. The image displayed on the image display unit by means of this live view function (hereinafter referred to as the live view image) are used for checking the view angle and the composition. The digital camera loaded with a CMOS sensor has a problem that the rolling shutter distortion occurs also in the live view image and bothers the photographer.

The image data processor described in JPA No. 2012-080490 is capable of correcting the rolling shutter distortion of the live view image as well. However, as described above, since the image data processor in JPA No. 2012-080490 calculates the shift amounts of a subject image between the adjacent scanning lines, as the subject image is moving relatively to the imaging plane of the CMOS sensor, there will be a time lag in displaying the live view image if it takes much time for this calculation. Considering the abovementioned application of the live view image, such a display time lag of the live view image is not preferable. Meanwhile, the method of moving the image sensor or the compensation lens on the basis of the detection result from the shake detection sensor, as employed in the shake compensation device in JPA No. 2011-103631, would not cause such a display time lag of the live view image because the shake compensation has been executed at the time of imaging through the CMOS sensor. However, the shake compensation method by moving the image sensor or the compensation lens is merely effective for correcting a blur due to instability of the camera such as camera shake, but not suitable for correcting a picture deviation caused by a large motion such as the panning of the camera.

Therefore, it is preferable to correct the rolling shutter distortion of the live view image in the manner as described in JPA No. 2012-080490, by means of an image data processor on the basis of the detection result from a shake detection sensor. However, in some kinds of interchangeable lens digital cameras, in which CMOS sensors are increasingly employed, a shake detection sensor and a shake compensation device including a compensation lens are integrated in the interchangeable lens so as to perform the shake compensation by the interchangeable lens independently. In these kinds of interchangeable lens digital cameras, the detection result from the shake detection sensor is not transmitted from the interchangeable lens to the camera body for the sake of correcting the rolling shutter distortion. Because a CMOS sensor and an image data processor are built in the camera body, it is impossible to correct the rolling shutter distortion of the live view image on the camera body side on the basis of the detection result from the shake detection sensor of the interchangeable lens.

SUMMARY OF THE INVENTION

An object of the present invention is to provide an interchangeable lens digital camera which is capable of correcting the rolling shutter distortion which may occur in the live view image, without a delay in displaying the live view image.

An interchangeable lens digital camera in accordance with the present invention comprises an interchangeable lens, a camera body and communication units. The interchangeable lens has a shake detection sensor, a shake compensation device and a lens controller. The shake detection sensor detects the direction and amount of a shake of the interchangeable lens. The shake compensation device compensates for the shake by moving a shake compensation lens, which is located in the light path of the interchangeable lens, on the basis of the direction and amount of the shake. The lens controller transmits deviation information based on the direction and amount of the shake through communication units to the camera body. The camera body has an image sensor, an image data processor and a body controller, and the interchangeable lens is detachably attachable to the camera body. The image sensor has a plurality of pixels arranged in a matrix to acquire a subject image and output an image signal. The image data processor produces a live view image from the image signal, so as to display the live view image on an image display unit. The body controller controls the camera body. The communication units include a serial communication unit and a condition communication unit, and are electrically connected by attaching the interchangeable lens to the camera body, enabling communication between the lens and the camera body. The serial communication unit is for serial communication of information between the lens controller and the body controller. The condition communication unit is for communication of condition informing signals, which represent conditions of the interchangeable lens and the camera body, between the lens controller and the body controller. The lens controller and body controller transmit and receive the deviation information through one of the serial communication unit and the condition communication unit.

Preferably, the body controller controls the image data processor to selectively execute a first process and a second process. The first process is cropping an image signal for one scanning line after another from a predetermined cropping range, the scanning line being a row of the pixels in the matrix. The second process is determining a corrected cropping range on the basis of the deviation information and cropping an image signal for one scanning line after another from the corrected cropping range.

Preferably, the lens controller transmits mode information indicating whether the shake compensation device is active or inactive to the body controller through the serial communication unit, so that the body controller controls the image data processor to execute the first process when the shake compensation device is active. When the shake compensation device is inactive, the body controller controls the image data processor to execute the second process.

Preferably, the body controller refers to a determination result on the shake compensation limit when the shake compensation device is active. The lens controller determines whether or not the amount of the shake exceeds a shake compensation limit of the shake compensation device, and transmits the determination result on the shake compensation limit to the body controller. The body controller refers to the determination result on the shake compensation limit and controls the image data processor to execute the first process if the amount of the shake does not exceed the shake compensation limit. If the determination result is that the amount of the shake exceeds the shake compensation limit, the body controller controls the image data processor to execute the second process.

Preferably, the body controller further refers to a determination result on the panning if the shake amount does not exceed the shake compensation limit. The lens controller determines on the basis of the deviation information whether the panning is carried out or not, and transmits the determination result on the panning to the body controller. The body controller refers to the determination result on the panning and controls the image data processor to execute the first process if the panning is not carried out. If the determination result is that the panning is carried out, the body controller controls the image data processor to execute the second process.

When executing electronic zooming for displaying a part of an live view image in an enlarged size, the body controller preferably compares a designated magnification of the electronic zooming with a prescribed magnification that is predetermined to require the second process, and controls the image data processor to execute the first process when the designated magnification is less than the prescribed magnification, or controls the image data processor to execute the second process when the designated magnification is not less than the prescribed magnification.

The body controller preferably compares an actual frame rate of the image sensor with a prescribed frame rate that is predetermined to require the second process. When the actual frame rate is higher than the prescribed frame rate, the body controller controls the image data processor to execute the first process. When the actual frame rate is not higher than the prescribed frame rate, the body controller controls the image data processor to execute the second process.

Preferably, the body controller controls the image data processor to execute the first process while an imaging preparation instructing section is being operated, and controls the image data processor to execute the second process when the operation on the imaging preparation instructing section is released.

Preferably, the lens controller converts the deviation information corresponding to each scanning line to the condition informing signal, the scanning line being a row of the pixels in the matrix, and transmits the condition information signal for each scanning line to the body controller through the condition communication unit.

Preferably, the condition communication unit is an analog communication unit that serves an analog signal as the condition informing signal, wherein the lens controller converts the deviation information to an analog signal and transmits the analog signal to the body controller.

Preferably, the condition communication unit is a pulse width modulation communication unit that serves a pulse width modulation signal as the condition informing signals, wherein the lens controller modifies the duty ratio of the pulse width modulation signal according to the deviation information and transmits the pulse width modulation signal to the body controller.

Preferably, the body controller controls the image data processor to execute the second process before a resizing process for adjusting the resolution of the live view image to the resolution of the image display unit.

The body controller may preferably control the image data processor to execute the second process after a resizing process for adjusting the resolution of the live view image to the resolution of the image display unit.

Alternatively, the body controller compares the number of scanning lines before the resizing process for adjusting the resolution of the live view image to the resolution of the image display unit with an estimated number of scanning lines of a live view image after the resizing process, so as to control the image data processor to execute the second process on one live view image that has less scanning lines between the live view images before and after the resizing process.

When displaying an image part in a first zooming zone in an enlarged size, the first zooming zone being determined on the live view image, the image data processor preferably determines a second zooming zone that is extended from the first zooming zone by adding a necessary area for the second process to the periphery of the first zooming zone, executes the second process using image signals in the second zooming zone, and crops an image part in the first zooming zone of an image which is undergone the second process, to enlarge and display the cropped image part as the live view image.

The interchangeable lens digital camera of the present invention, wherein the deviation information including the direction and amount of the shake compensation detected by the shake detection sensor of the interchangeable lens is transmitted from the interchangeable lens to the camera body through either the serial communication unit or the condition communication unit, makes it possible for the camera body to correct the rolling shutter distortion on the basis of the deviation information even if the camera body is not provided with a shake detection sensor. Furthermore, since the deviation information based on the detection result from the shake detection sensor is used for correcting the rolling shutter distortion of the live view image, and the deviation information is available more quickly than calculating the shake amount by comparing the image signal of one scanning line with another. Therefore, it is possible to correct the rolling shutter distortion without a delay in displaying the live view image.

BRIEF DESCRIPTION OF THE DRAWINGS

For more complete understanding of the present invention, and the advantage thereof, reference is now made to the subsequent descriptions taken in conjunction with the accompanying drawings, wherein:

FIG. 12 is a flowchart illustrating an imaging procedure for a live view image;

FIG. 14 is a flowchart illustrating an imaging procedure for live view images in accordance with a second embodiment;

FIG. 26 is an explanatory diagram illustrating an example of resizing process on a live view image;

FIG. 27 is an explanatory diagram illustrating another example of resizing process on a live view image;

FIG. 30 is a flowchart illustrating a process for correcting the rolling shutter distortion of a live view image in accordance with the ninth embodiment.

DESCRIPTION OF THE PREFERRED EMBODIMENTS

First Embodiment

Figure 1:
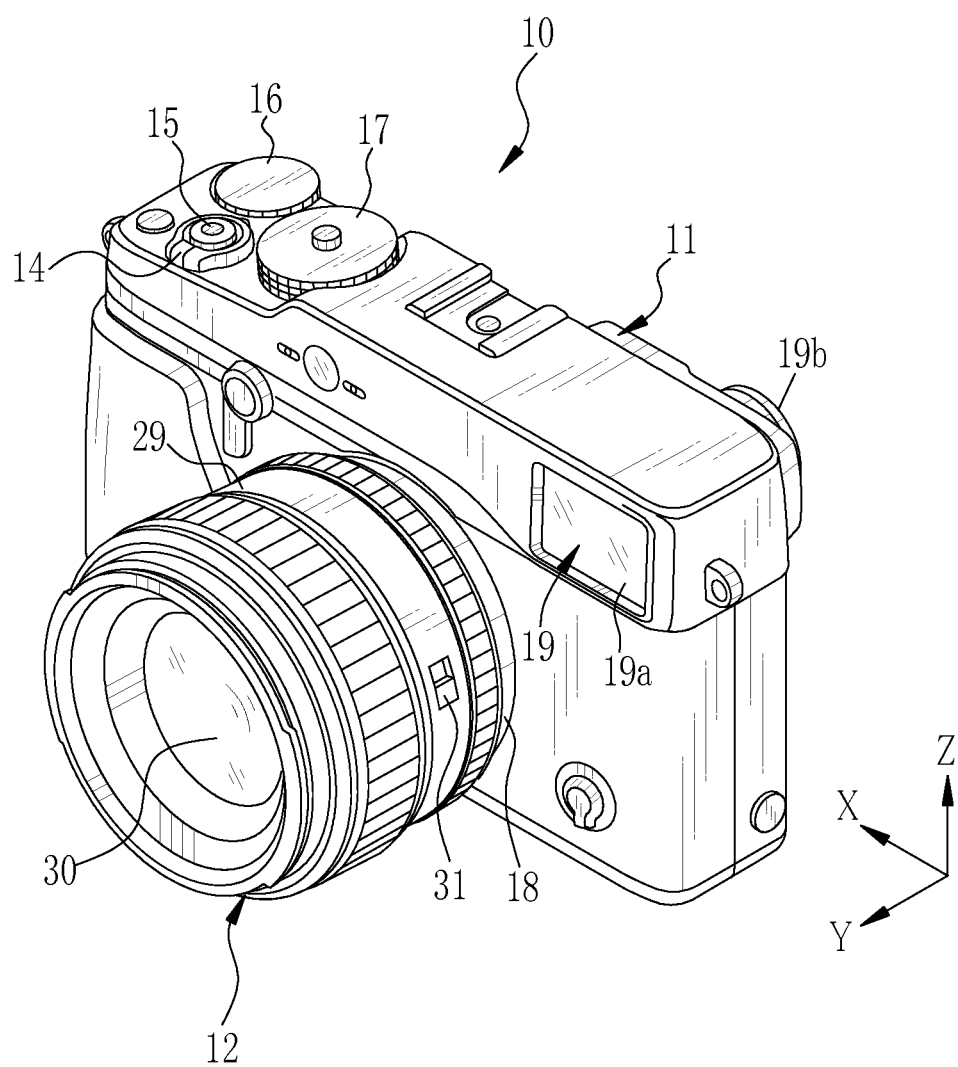
FIG. 1 is a perspective diagram illustrating the front appearance of an interchangeable lens digital camera of the present invention.
Figure 2:
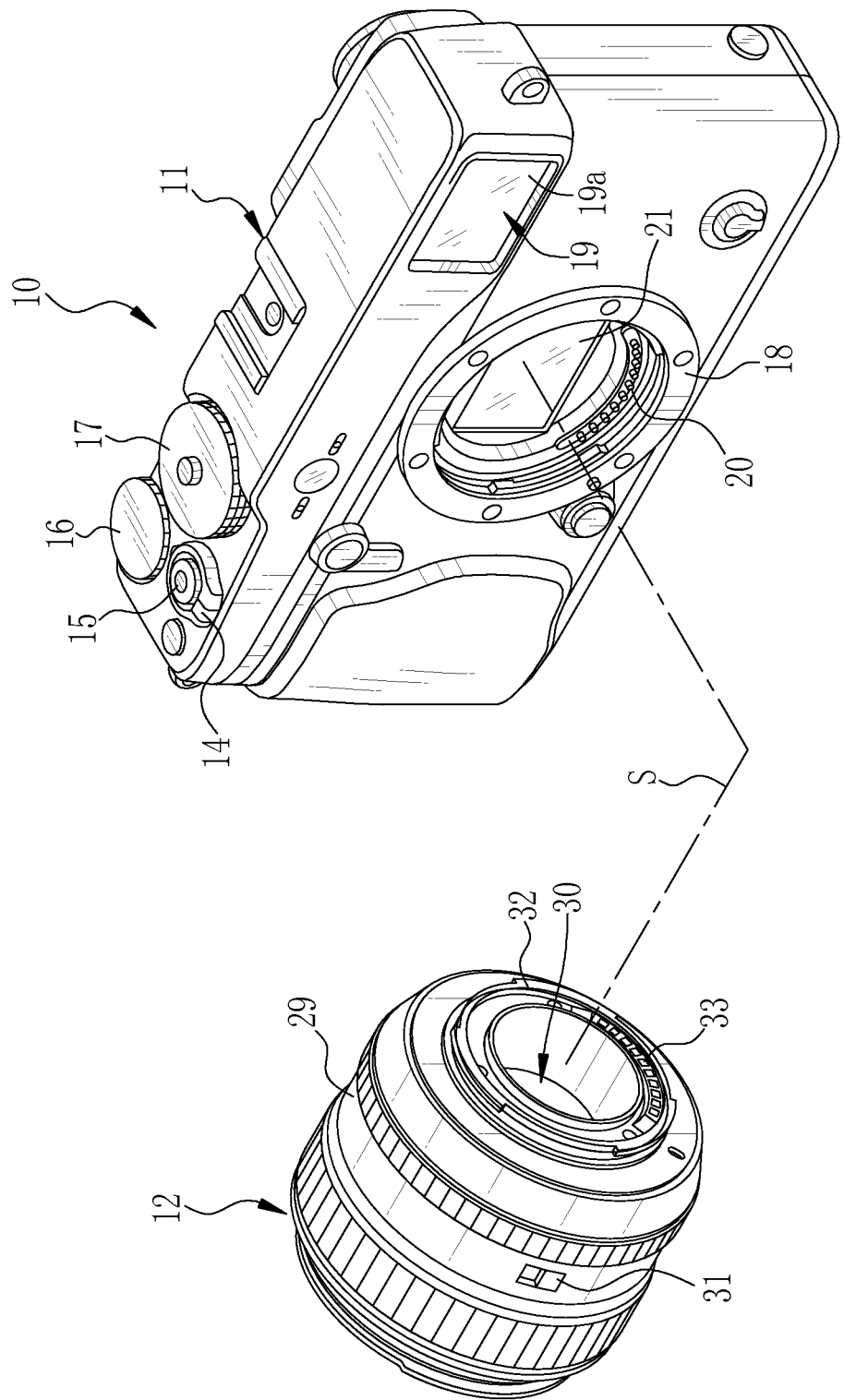
FIG. 2 is a perspective diagram illustrating the appearance of a camera body of the interchangeable lens digital camera, separated from an interchangeable lens.

In FIGS. 1 and 2, a lens interchangeable digital camera (hereinafter referred to as a camera) embodying the present invention is provided with a camera body 11, an interchangeable lens 12 that is detachably attachable to the camera body 11, and communication units that are electrically connected by attaching the interchangeable lens 12 to the camera body 11, enabling communication between the camera body 11 and the interchangeable lens 12. The camera 10 is a mirrorless single-lens reflex digital camera capable of using an appropriate interchangeable lens 12 for the purpose or intention of the photography. The camera 10 acquires an image of a subject through a CMOS sensor 21 that is integrated in the camera body 11. The camera 10 also has an optical shake compensation device 13 (refer to FIG. 4) which is integrated in the interchangeable lens 12 and makes a compensation for a camera shake so as to stabilize the optical image. The optical shake compensation device 13 may be called an optical image stabilizer, and corresponds to the shake compensation device in the present invention. Furthermore, the camera 10 displays a live view image after correcting a rolling shutter distortion thereof. As set forth in detail later, the rolling shutter distortion correction is performed on the side of the camera body 11 while detecting the camera shake or the panning operation on the side of the interchangeable lens 12 and transmitting the detection result to the camera body 11 through the communication unit.

The camera body 11 has a power lever 14, a release switch 15, an exposure correction dial 16, a shutter speed dial 17, etc. on a top side thereof. The release switch 15 is an operation means for inputting an instruction to start an imaging process, and also corresponds to an imaging preparation instructor in the present invention. The release switch 15 is configured of a two-step stroke switch that provides so-called "half-press" and "full-press" positions. The release switch 15 outputs an S1-ON signal upon being half-pressed, and then outs an S2-ON signal upon being further pressed to the full. The camera 10 executes an imaging preparation process, including an auto-focusing (AF processing) and an automatic exposure control (AE processing), in response to the output of the S1-ON signal. The camera 10 executes the imaging process in response to the output of the S2-ON signal.

Note that the release switch 15 is not limited to the abovementioned configuration of two-step stroke switch, but may output the S1-ON signal and the S2-ON signal upon a single operation. Alternatively, it is possible to provide independent switches for outputting the S1-ON signal and the S2-ON signal. In a configuration operating with a touch-panel, the S1-ON signal and the S2-ON signal may be output by touching designated areas on a touch-panel screen. In the present invention, the operation means is not limited to these configurations insofar as the means instructs the imaging preparation process and the imaging process. Furthermore, the imaging preparation process and the imaging process may also be executed successively upon operation on a single operation means.

A mount 18 for attaching the interchangeable lens 12 and an objective lens 19a of a viewfinder 19 are disposed on the front of the camera body 11. Body-side signal contacts are provided inside an opening of the mount 18, for electrical connection of the camera body 11 to the interchangeable lens 12, enabling communication therebetween. The CMOS sensor 21 integrated in the camera body 11 is exposed through the opening of the mount 18. In FIG. 2, a shutter unit 68 (refer to FIG. 4) is in an open position, wherein the CMOS sensor 21 is exposed.

The interchangeable lens 12 includes a lens barrel 29, imaging optics 30, an optical image stabilizer (OIS) switch 31, a lens-side mount 32 and lens-side signal contacts 33. By joining the lens-side mount 32 to the mount 18 and then turning the interchangeable lens 12, the interchangeable lens 12 is attached to the camera body 11. After being attached to the camera body 11, the interchangeable lens 12 may be detached from the camera body 11 by turning the interchangeable lens 12 in the opposite direction to the mounting direction.

The imaging optics 30 form a subject image on the CMOS sensor 21. The OIS switch 31 is disposed on an outer peripheral surface of the lens barrel 29 and used for switching the shake compensation device 13 on or off. As the interchangeable lens 12 is attached to the camera body 11 through the lens-side mount 32 and the mount 18, the lens-side signal contacts 33 come into contact with the body-side signal contacts 20, electrically connecting communication lines for communication between the interchangeable lens 12 and the camera body 11.

Figure 3:
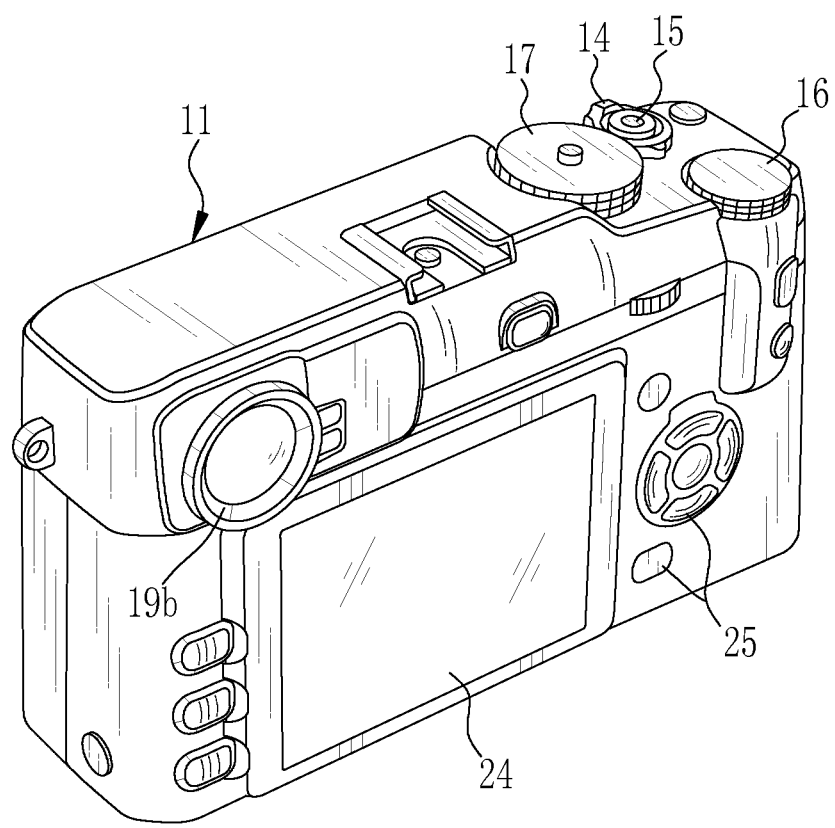
FIG. 3 is a perspective diagram illustrating the rear side appearance of the camera body.

As shown in FIG. 3, the camera body 11 is provided with an image display unit 24, operation buttons 25 used for various setup operations and the like, an eyepiece 19b of the viewfinder 19, etc. on the rear side thereof. The image display unit 24 is used for displaying the live view image and reproducing captured images. The image display unit 24 is constituted of an LCD, for example. The viewfinder 19 is switchable between an optical finder and an electronic finder. The optical finder conducts light incident on the objective lens 19a to the eyepiece 19b, permitting observing the subject through the eyepiece 19b. When the viewfinder 19 is switched to the electronic finder, the live view image acquired through the CMOS sensor 21 is displayed on an electronic view finder (EVF) panel 27 which is placed behind the eyepiece 19b (refer to FIG. 4). Thus, the live view image on the EVF panel 27 is observed through the eyepiece 19b.

The camera 10 has a capability of electronic zooming (digital zooming), whereby a part of an acquired image is cropped and enlarged. If the attached interchangeable lens 12 is of an optical zooming type, both optical zooming by changing the focal length of the interchangeable lens 12 and the electronic zooming are available to the camera 10. In that case, the operation buttons 25 are commonly used for optical zooming and electronic zooming.

The magnification of electronic zooming is designated according to a zooming operation beyond the focal length range of the interchangeable lens 12. For example, when one operation button 25 is operated for zooming toward the telephoto side, the focal length of the interchangeable lens 12 is changed from the wide-angle side toward the telephoto side (the optical zooming). If the operation button 25 is further operated for zooming toward the telephoto side after the interchangeable lens 12 gets to the telephoto terminal, a command to activate the electronic zooming is given, and the zooming magnification of the electronic zooming starts to increase gradually. When another operation button 25 is operated for zooming toward the wide-angle side while the electronic zooming is active, the zooming magnification of the electronic zooming decreases gradually, and when the zooming magnification gets back to "1", the electronic zooming is deactivated. With further zooming operation toward the wide-angle side, the focal length of the interchangeable lens 12 is changed to the wide-angle side (the optical zooming). If the interchangeable lens 12 is of a prime type, the zooming operation on the operation buttons 25 immediately effects the electronic zooming. Also in this case, the electronic zooming is cancelled when the zooming magnification is "1".

Figure 4:
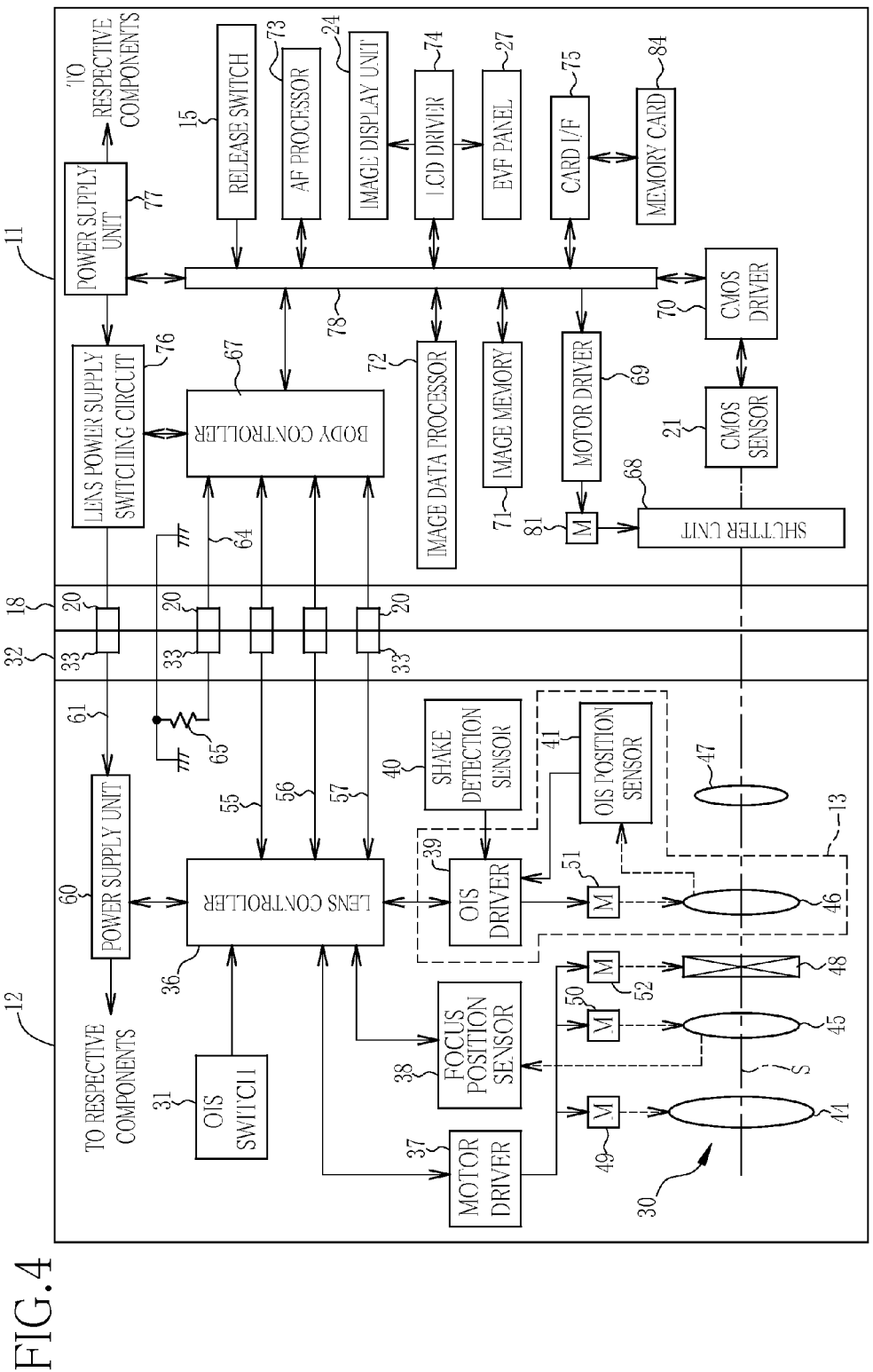
FIG. 4 is a block diagram illustrating the structure of the interchangeable lens digital camera.

As shown in FIG. 4, the interchangeable lens 12 further includes a lens controller 36, a motor driver 37, a focus position sensor 38, an OIS (optical image stabilizer) driver 39, a shake detection sensor 40 and an OIS position sensor 41 in addition to the imaging optics 30. Note that FIG. 4 illustrates an example wherein the interchangeable lens 12 attached to the camera body 11 is of a zoom lens type.

The lens controller 36, which is constituted of a microcomputer equipped with a CPU, a ROM storing programs and parameters for use in the CPU, a RAM used as a work memory for the CPU, etc. (these elements being not shown in the drawings though), controls respective components of the interchangeable lens 12. The lens controller 36 receives an operation signal for switching the shake compensation device 13 between active and inactive modes, which is input through the OIS switch 31.

The imaging optics 30 is provided with a plurality of lens elements, including a zooming lens 44, a focusing lens 45, an OIS (optical image stabilizer) lens 46 and a rear lens 47, a stop unit 48 disposed in between the focusing lens 45 and the OIS lens 46. The zooming lens 44 is driven by a motor 49 to move in the direction of an optical axis S, to change the focal length of the interchangeable lens 12. The focusing lens 45 is driven by a motor 50 to move in the direction of the optical axis S, so as to adjust the focal point. The OIS lens 46 is moved by a motor 51, which is driven by the OIS driver 39, in a plane perpendicular to the optical axis S so as to compensate for the camera shake; the OIS lens 46 corresponds to the shake compensation lens in the present invention. The stop unit 48 is driven by a motor 52 to move a number of stop blades (not shown in the drawings), so as to adjust the amount of light incident on the CMOS sensor 21.

The motor driver 37 controls driving the motors 49, 50 and 52. The focus position sensor 38 detects the lens position of the focusing lens 45 in the direction of the optical axis and inputs focus position information about the detected position of the focusing lens 45 to the lens controller 36. The lens controller 36 transmits the focus position information to the camera body 11 in synchronism with a vertical synchronization signal that is transmitted from the camera body 11 to the interchangeable lens 12. The camera body 11 transmits the vertical synchronization signal to the interchangeable lens 12 in order to obtain the focus position information for every imaging of one frame.

In combination with the abovementioned OIS lens 46 and the motor 51, the OIS driver 39 and the OIS position sensor 41 constitute the shake compensation device 13, which works on the basis of the detection result from the shake detection sensor 40. The OIS driver 39 starts a camera shake compensation process upon the OIS switch 31 being turned on. The shake detection sensor 40 is, for example, a known gyro sensor, and detects the direction and amount of a shake of the camera 10 due to the camera shake by hands or the panning. The shake detection sensor 40 detects the direction and amount of a shake with respect to a pitching direction of the camera 10 (a motion around X-axis in FIG. 1) and the direction and amount of a shake with respect to a yaw direction (a motion around Z-axis in FIG. 1), individually. The direction and amount of a shake are detected at a shorter interval than the interval of a horizontal synchronizing signal, so as to detect ones a plurality of times in one frame period. The direction and amount of each shake detected by the shake detection sensor 40 are output as a shake detection signal to the OIS driver 39. Note that X-, Y- and Z-axes in FIG. 1 are orthogonal to each other, wherein Y-axis is parallel to the optical axis S, and X-axis and Z-axis are parallel to the horizontal direction and the vertical direction of the camera 10, respectively.

The OIS position sensor 41 detects the position of the OIS lens 46 in the plane perpendicular to the optical axis S, and outputs a position detection signal representative of the detected position to the OIS driver 39. The OIS driver 39 controls driving the motor 51 on the basis of the shake detection signal and the position detection signal, to move the OIS lens 46 so as to correct the blurry image due to the camera shake.

As set forth later, the lens controller 36 calculates deviation information for each frame on the basis of the shake detection signals, and transmits the deviation information to a body controller 67. In an example, the deviation information is calculated on the basis of first several shake detection signals among a plurality of shake detection signals which are output in one frame period. According to the present embodiment, the deviation information is transmitted to the body controller 67 through serial communication, as set forth later.

The lens controller 36 is connected to a universal mutual communication line 55 used for transmitting various condition-informing signals representative of various conditions of the interchangeable lens 12 and the camera body 11, a vertical synchronization signal line 56 and a serial communication line 57 for transmitting serial signals. A universal mutual communication line 55, a vertical synchronization signal line 56 and a serial communication line 57 are also provided in the camera body 11. The same kinds of lines are respectively interconnected through the body side contacts 20 and the lens side contacts 33.

A power supply unit 60 is supplied with power from the camera body 11 through a power supply line 61, and supplies power to respective components of the interchangeable lens 12. A power supply line 61 is also provided in the camera body 11, and is connected to the same in the interchangeable lens 12 through ones of the body side contacts 20 and the lens side contacts 33.

The camera body 11 and the interchangeable lens 12 are each provided with a lens detection signal line 64 in addition to the abovementioned various signal lines 55 to 57 and the power supply line 61. In the interchangeable lens 12, the lens detection signal line 64 is connected to the ground through a resistor element 65. Thus, when one body side contact 20 for the lens detection signal line 64 is connected to one lens side contact 33 for the lens detection signal line 64, a lens detection signal is generated on the lens detection signal line 64. By means of the lens detection signal, the body controller 67 detects that the interchangeable lens 12 is attached to the camera body 11.

The camera body 11 has the body controller 67, the shutter unit 68, a motor driver 69, a CMOS driver 70, an image memory 71, an image data processor 72, an AF processor 73, an LCD driver 74, a card I/F 75, a lens power supply switching circuit 76, a power supply unit 77, etc., in addition to the abovementioned release switch 15, the CMOS sensor 21, the image display unit 24 and the EVF panel 27. The release switch 15, the body controller 67, the motor driver 69, the CMOS driver 70, the AF processor 73, the LCD driver 74, the card I/F 75, the power supply unit 77, the image memory 71 and the image data processor 72 are connected through a bus line 78.

The body controller 67 is provided with a CPU, a ROM storing programs and parameters for use in the CPU, a RAM serving as a work memory for the CPU, etc. (not shown in the drawings), controls respective components of the camera body 11. The S1-ON signal and the S2-ON signal from the release switch 15 are input to the body controller 67. The universal mutual communication line 55, the vertical synchronization signal line 56, the serial communication line 57 and the lens detection signal line 64 are also connected to the body controller 67.

The shutter unit 68 is a so-called focal plane shutter that is disposed in front of the CMOS sensor 21. The shutter unit 68 is capable of taking an open position permitting an imaging light from the rear lens 47 to fall on the CMOS sensor 21 in the open position and a closed position blocking the imaging light from the CMOS sensor 21. The shutter unit 68 is set to the open position during the imaging of live view images and video images, and is temporarily set to the closed position during the imaging of a still image. The shutter unit 68 is driven by a shutter motor 81, and the motor driver 69 controls driving the shutter motor 81.

The CMOS sensor 21 is controlled by the CMOS driver 70. The CMOS driver 70 generates the vertical synchronization signal that defines the timing to start imaging for one frame, and a horizontal synchronization signal that defines the timing to start exposure for each scanning line, and inputs these synchronization signals to the CMOS sensor 21. In synchronism with the vertical and horizontal synchronization signals, a subject image, which is formed on the CMOS sensor 21 through the imaging optics 30 of the interchangeable lens 12, is acquired through the CMOS sensor 21 according to the rolling shutter method, and is output as an analog image signal from the CMOS sensor 21. The CMOS driver 70 renders the image signal into a digitalized image signal (image data) through known signal-processing, such as first-stage amplification, gain control and AD conversion, and outputs the image signal to the bus line 78.

The image memory 71 stores the image signal output to the bus line 78. The image data processor 72 reads out the image signal of one frame from the image memory 71, to process the image signal through known image-processing, such as matrix operation, demosaicing, gamma correction and luminance-chrominance conversion. Furthermore, the image data processor 72 corrects rolling shutter distortion through a distortion correcting process, and executes a resizing process for adjusting the resolution (pixel number) of the live view image to the resolution of the image display unit 24. The image data processor 72 applies the electronic zooming also to the resizing process. The electronic zooming includes a process of cropping an image part, which is bounded in a zooming zone that is determined according to a zooming magnification designated by the zooming operation, out of the live view image.

The AF processor 73 calculates an AF evaluation value from the image signal, the AF evaluation value being an integrated value of contrasts between the individual pixels. The body controller 67 determines a lens position of the focusing lens 45, at which the AF evaluation value becomes the largest, on the basis of the AF evaluation value calculated for each frame and the focus position information transmitted from the interchangeable lens 12. The body controller 67 transmits the lens position, at which the AF evaluation value becomes the largest, as an AF control signal to the lens controller 36. The lens controller 36 controls the motor driver 37 on the basis of the AF control signal, so as to move the focusing lens 45 to the lens position indicated by the AF control signal. Thus, the interchangeable lens 12 is focused on the subject.

The LCD driver 74 drives the image display unit 24 and the EVF panel 27 on the basis of the image signals which have been processed in the image data processor 72 and are sequentially input in the LCD driver 74. Thus, the image display unit 24 and the EVF panel 27 display the live view image which is periodically revised. The card I/F 75 is integrated in a card slot (not shown) that is provided in the camera body 11, so as to be electrically connected to a memory card 84 as inserted in the card slot. Though the card I/F 75, the image signals processed in the image data processor 72 is written on the memory card 84. In addition, in order to reproduce the image signals written on the memory card 84, the image signals are read from the memory card 84 through the card I/F 75.

The lens power supply switching circuit 76 is for switching the power of the interchangeable lens 12 on or off. The lens power supply switching circuit 76 supplies power to the power supply unit 60 of the interchangeable lens 12 through the power supply line 61 when a lens detection signal is input through the lens detection signal line 64 to the body controller 67. The lens power supply switching circuit 76 turns off the power to the interchangeable lens 12 when the body controller 67 does not receive the lens detection signal, that is, when the interchangeable lens 12 is detached from the camera body 11. The power to the interchangeable lens 12 is supplied from the power supply unit 77 of the camera body 11.

Figure 5:
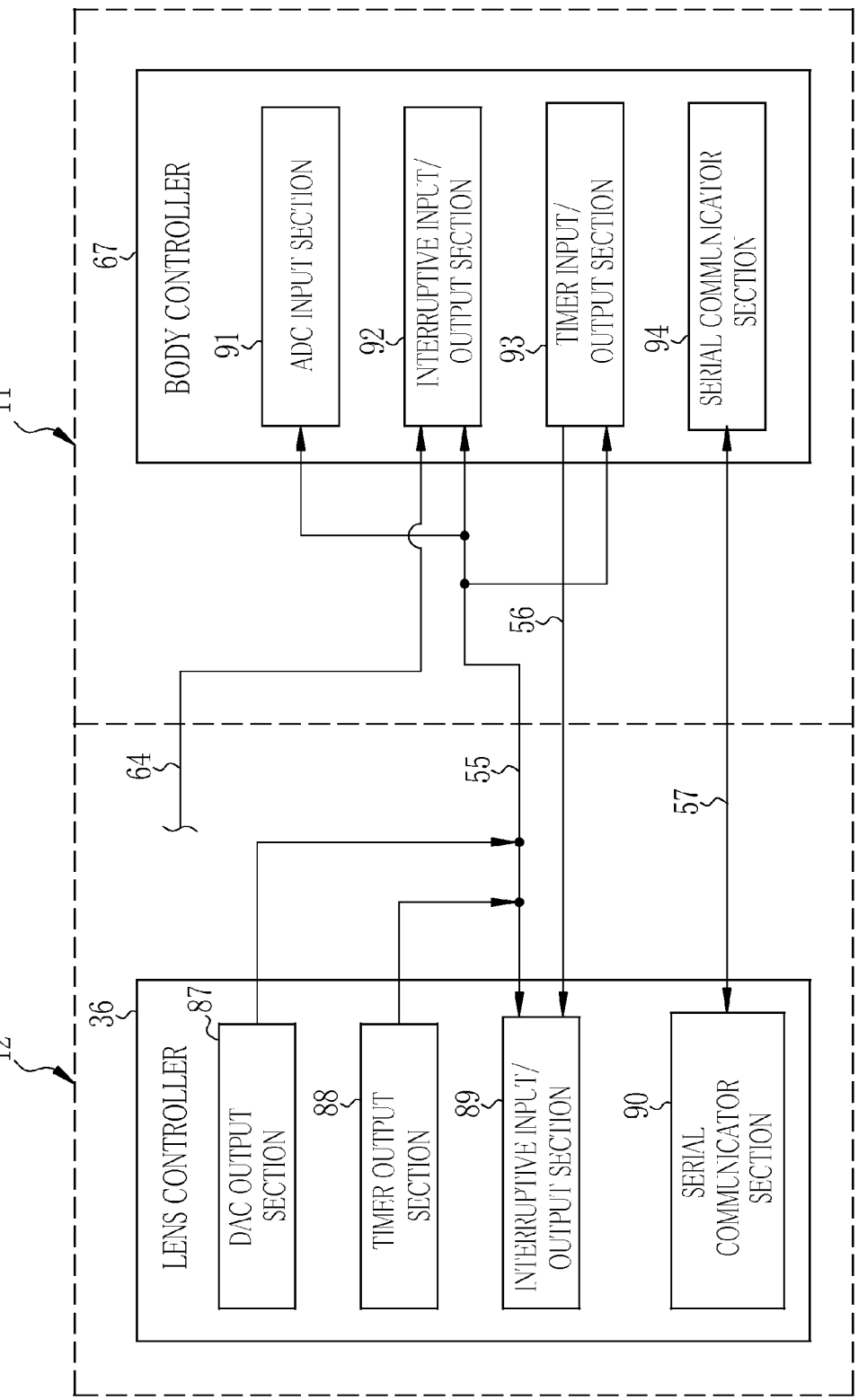
FIG. 5 is a block diagram illustrating communication units of a lens controller and a body controller.

As shown in FIG. 5, the lens controller 36 is provided with a DAC output section 87, a timer output section 88, an interruptive input/output section 89 and a serial communicator section 90. The body controller 67 is provided with a ADC input section 91, an interruptive input/output section 92, a timer input/output section 93 and a serial communicator section 94.

The DAC output section 87 converts a digital signal to an analog signal and transmits the analog signal through the universal mutual communication lines 55 to the ADC input section 91. The timer output section 88 generates a pulse width modulation (PWM) signal and transmits the PWM signal through the universal mutual communication lines 55 to the timer input/output section 93. The interruptive input/output sections 89 and 92 each generate an interruptive signal and transmit the interruptive signal to each other through the universal mutual communication lines 55. The DAC output section 87, the universal mutual communication lines 55 and the ADC input section 91 constitute a condition communication unit, whereas the timer output section 88, the universal mutual communication lines 55 and the timer input/output section 93 constitute another condition communication unit. Both of the condition communication units are used for exchanging information on operating conditions of the camera body 11 or the interchangeable lens 12, which is necessary for the camera body 11 and the interchangeable lens 12 to obtain as soon as possible, and correspond to the condition communication units of the present invention.

One condition communication unit, which consists of the DAC output section 87, the universal mutual communication lines 55 and the ADC input section 91, is an analog communication unit for transmitting an analog signal informing of operating conditions of the interchangeable lens 12 to the camera body 11. For example, information on operating conditions, such as driving conditions of the AF operation or the actuation period of the interchangeable lens 12, is converted through the DAC output section 87 into an analog signal, which is transmitted through the universal mutual communication lines 55 to the ADC input section 91. The focus position information is transmitted during the AF processing upon the release switch 15 being half-pressed. For such a control that needs a high-speed response, like AF processing, in which the next action should start immediately after the completion of a foregoing action, it is possible to transmit the information on the conditions of the interchangeable lens 12 to the camera body 11 faster through the DAC output section 87, the universal mutual communication lines 55 and the ADC input section 91 in comparison with the serial communication that is regularly carried out for monitoring the conditions of the interchangeable lens 12.

The other condition communication unit, which consists of the timer output section 88, the universal mutual communication lines 55 and the timer input/output section 93, is a PWM (pulse width modulation) communication unit that uses a PWM signal for communication. The PWM communication unit enables transmission of a variety of information, including operating conditions, from the interchangeable lens 12 to the camera body 11 through the universal mutual communication lines 55 which double as a part of the analog communication unit. The timer output section 88 converts the transmitting information into a PWM signal and the PWM signal is transmitted through the universal mutual communication line 55 to the timer input/output section 93.

The timer input/output section 93 of the body controller 67, the vertical synchronization signal line 56 and the interruptive input/output section 89 of the lens controller 36 are used for transmitting the vertical synchronization signal from the body controller 67 to the lens controller 36, at the same timing as inputting the vertical synchronization signal to the CMOS sensor 21. In the camera 10 of the present embodiment, the focusing is carried out according to a contrast AF method wherein a lens position where the image contrast becomes the highest is determined while moving the focusing lens 45, to adjust the focusing lens 45 to the determined lens position. For the purpose of improving the accuracy and the speed in the contrast AF method, it is necessary for the body controller 67 to obtain the focus position information on the position of the focusing lens 45 at the same timing as the start of reading the image signal from the CMOS sensor 21. Therefore, the lens controller 36 transmits the focus position information to the body controller 67 in synchronism with the vertical synchronization signal.

The serial communicator section 90, the serial communication lines 57 and the serial communicator section 94 constitute a known serial communication unit that is generally used in lens interchangeable cameras, and corresponds to the serial communication unit of the present invention. The serial communication unit and the above two condition communication units constitute the communication units of the camera 10. The serial communicator section 90, the serial communication lines 57 and the serial communicator section 94 are used for exchanging information on general conditions of the camera body 11 and the interchangeable lens 12 and general drive commands in the form of serial signals, and also used for exchanging product information on the camera body 11 and the interchangeable lens 12 for the shake of improving the lens controlling accuracy.

Figure 6:
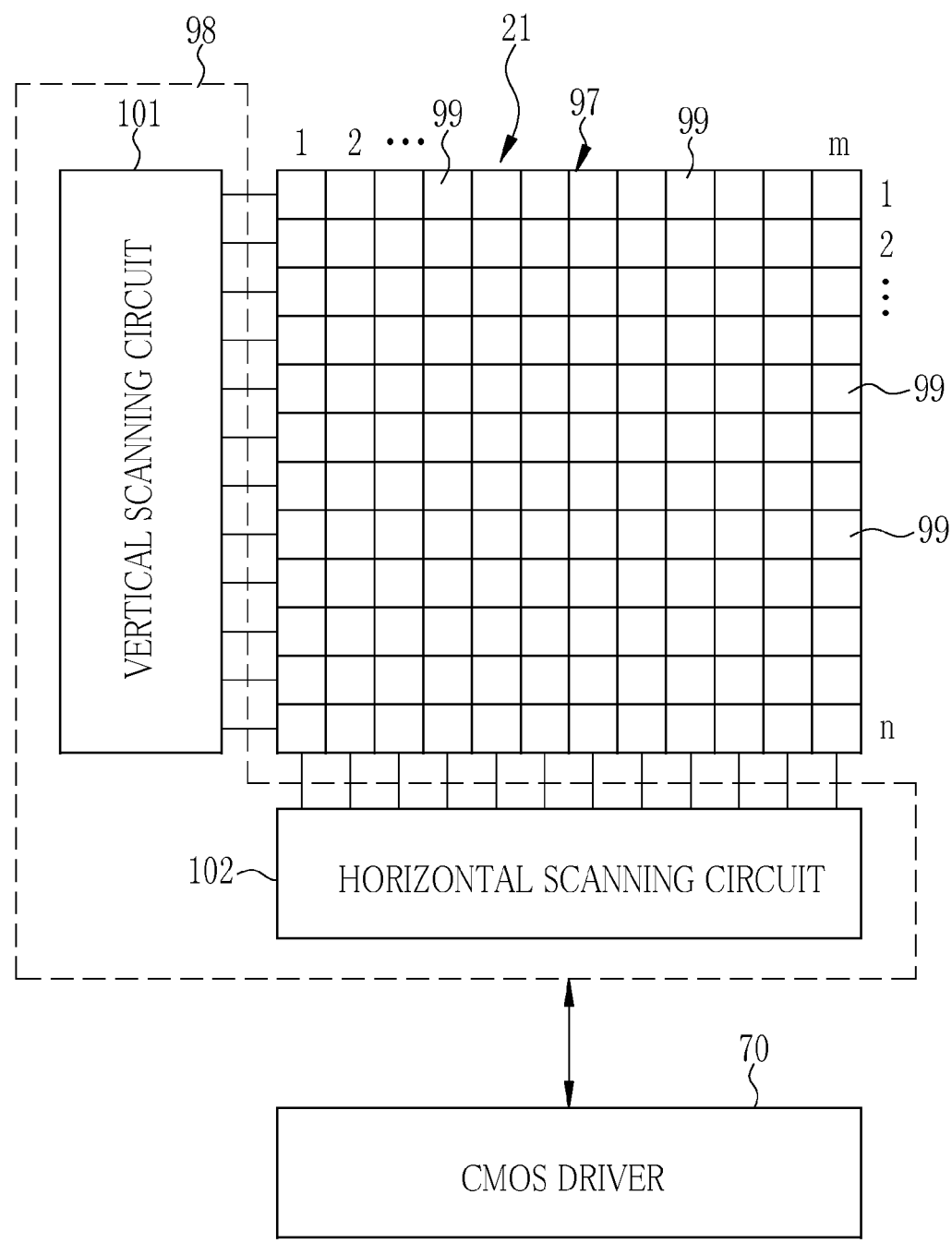
FIG. 6 is a schematic diagram illustrating a structure of CMOS image sensor.

As shown in FIG. 6, the CMOS sensor 21 is provided with an imaging unit 97 and a scanning section 98, and is controlled by the CMOS driver 70. The imaging unit 97 has a plurality of pixels 99 arranged in a two-dimensional matrix of m-columns and n-lines (m, n=natural numbers), each pixel 99 being constituted of a complementary metal-oxide semiconductor. Thus, the imaging unit 97 has "n" scanning lines. One scanning line is constituted of "m" pixels 99 aligned in a horizontal direction (the left-to-right direction in FIG. 6). The pixels 99 each accumulate signal charges corresponding to the exposure amount and convert the accumulated signal charges to a pixel signal. The pixel signals output from the "m" pixels of each scanning line constitute a line image signal, and "n" line image signals from the "n" scanning lines constitute one frame image signal.

The scanning section 98 is provided with a vertical scanning circuit 101 and a horizontal scanning circuit 102. The scanning section 98 activates the imaging unit 97 in the rolling shutter method according to the vertical and horizontal synchronization signals from the CMOS driver 70. The vertical scanning circuit 101 sequentially selects the scanning lines to make a resetting operation for each line to sweep out the signal charges accumulated in the pixels of the selected scanning line. When an exposure time (shutter speed) has elapsed after the resetting operation, a reading operation is carried out. The time from the resetting operation to the reading operation defines an exposure period of each pixel 99 on one scanning line. In the reading operation, the signal charges accumulated in the pixels during the exposure period are converted to a pixel signal in each pixel, and the pixel signals are output from the pixels to the horizontal scanning circuit 102 through signal lines which are provided for the respective pixel columns. At one reading operation, the pixel signals from the "m" pixels of one line, that is, one line image signal is input to the horizontal scanning circuit 102. The horizontal scanning circuit 102 outputs the line image signal to the CMOS driver 70, for example, after processing the signal through a correlated double sampling (CDS).

Figure 7:
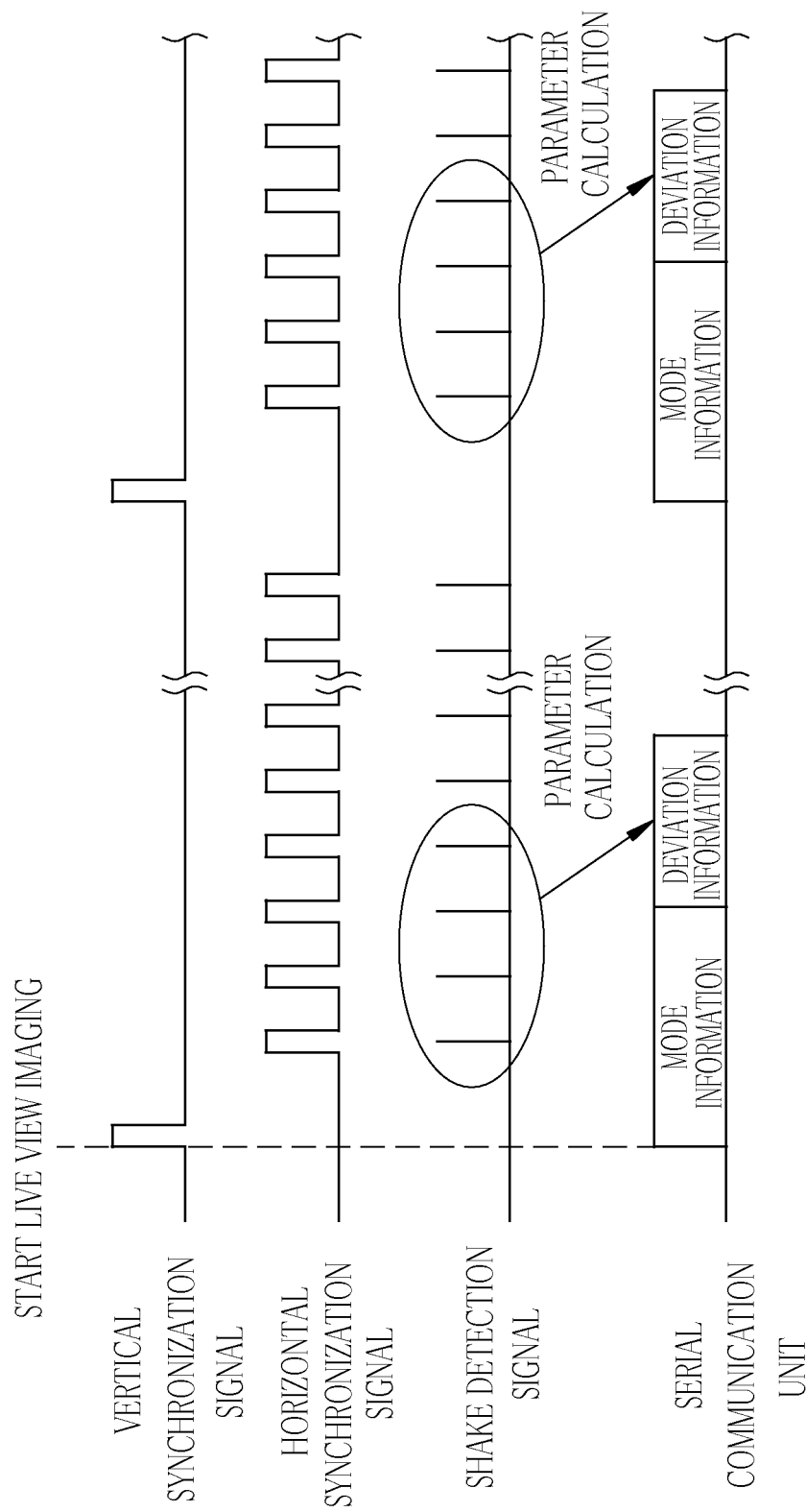
FIG. 7 is a timing chart illustrating various signals during the imaging of live view images.

As shown in FIG. 7, the vertical synchronization signal is input at intervals depending on the frame rate, and the imaging of one frame starts upon each input of the vertical synchronization signal. The horizontal synchronization signal is input at the timing of starting the exposure on each scanning line (at the timing of resetting operation), and at such intervals that the reading operation on one scanning line does not overlap the reading operation on another scanning line. The vertical scanning circuit 101 selects one scanning line after another in response to the horizontal synchronization signal, to start the exposure on the selected scanning line.

Figure 8:
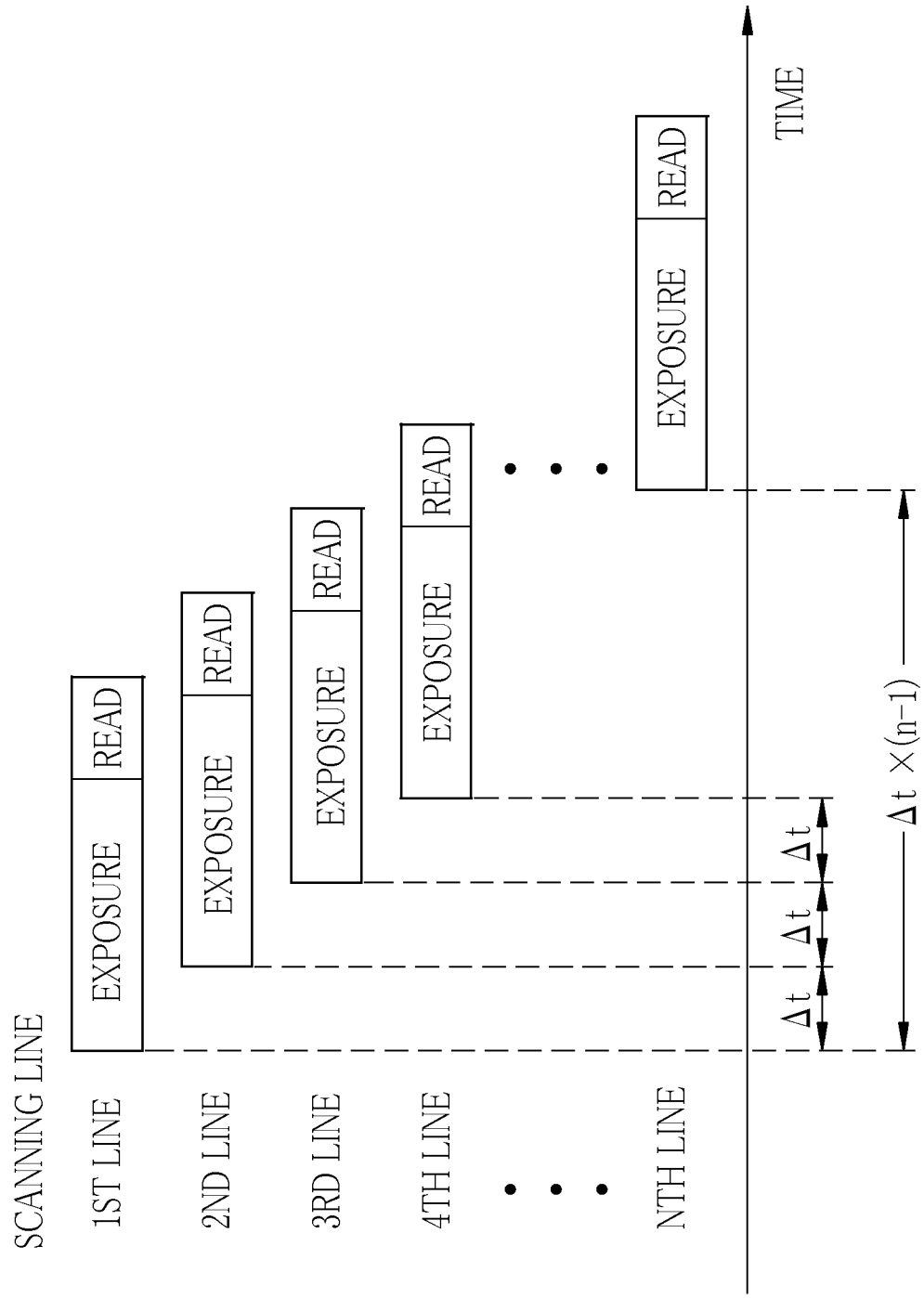
FIG. 8 is an explanatory diagram illustrating the shift of exposure timing between scanning lines.

As shown in FIG. 8, the exposure of the pixels on one scanning line starts from a moment when a time Δt necessary for the reading operation has elapsed after the start of exposure of the preceding scanning line. Accordingly, a time lag Δt(n−1) exits between the exposure time of the first scanning line and that of the n-th scanning line. It is to be noted that the exposure method is not limited to the rolling shutter method where the exposure timing is shifted from line to line, but may be a rolling shutter method where the exposure timing is shifted from pixel to pixel.

Figure 9:
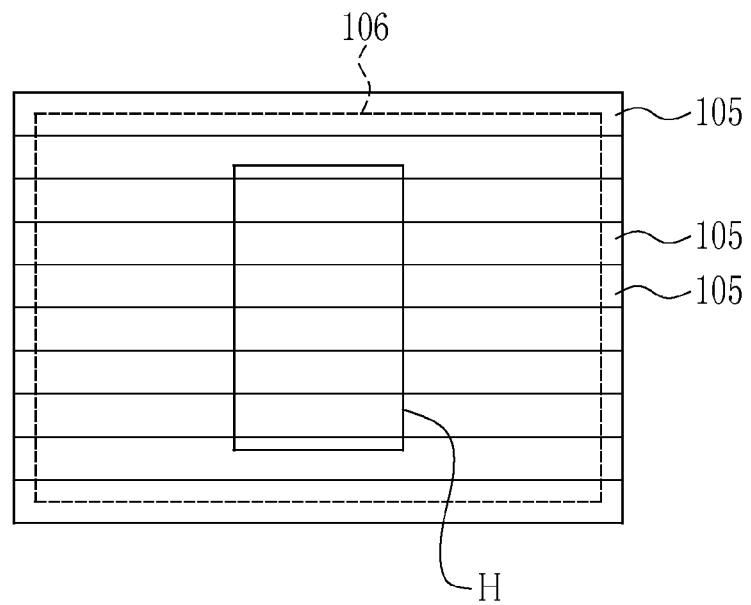
FIG. 9 is an explanatory diagram illustrating a live view image wherein the subject image does not suffer the rolling shutter distortion.

The image data processor 72 executes a first process and a second process. As shown in FIG. 9, the first process represents a process for cropping a predetermined cropping range 106 from the line image signals 105 of the respective scanning lines, in order to produce a live view image. Here, the "predetermined cropping range" represents a range within the image acquired through the CMOS sensor 21, confining an image part to be displayed as the live view image on the image display unit 24 or the EVF panel 27.

Figure 10:
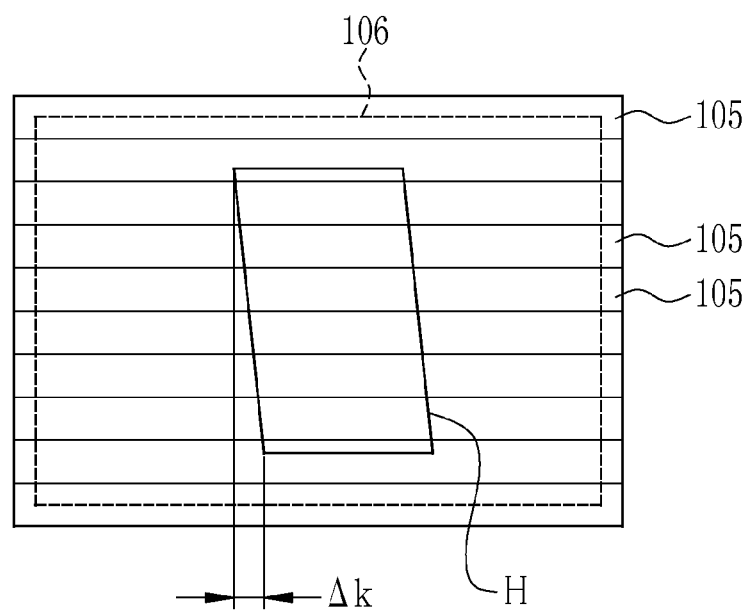
FIG. 10 is an explanatory diagram illustrating a live view image wherein the subject image suffers the rolling shutter distortion.

As described above, the imaging according to the rolling shutter method involves the time lag Δt in the exposure timing between the adjacent scanning lines, so that the time lag from the exposure time of the first scanning line to that of the n-th scanning line becomes Δt(n−1). Because of the time lag, the image acquired through the CMOS sensor 21 could suffer a rolling shutter distortion if the camera 10 sways due to the panning operation or the camera shake. For example, an image of a rectangular subject H could be distorted in the manner as shown in FIG. 10, wherein Δk indicates the amount of distortion.

The second process is for correcting such a rolling shutter distortion as above that occurs in the live view image. The second process includes determining a corrected cropping range on the basis of the direction and amount of a shake with respect to each scanning line, which is obtained from the deviation information, and cropping the image signal within the corrected cropping range, to produce a distortion-corrected live view image from the cropped image signal.

Figure 11:
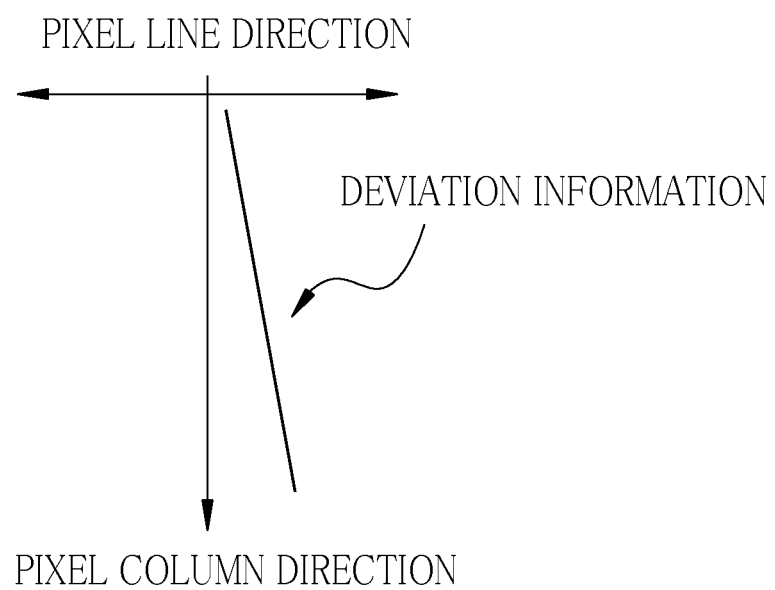
FIG. 11 is an explanatory diagram illustrating an example of the direction and amount of a shake for an image frame, indicated by deviation information.

The deviation information is calculated as a parameter that represents the fluctuation in the direction and amount of a shake during one frame exposure period in the form of a linear or multidimensional function. As shown in FIG. 11, the deviation information indicates the direction and amount of the shake with respect to the individual scanning lines which are arranged sequentially in the column direction of the pixels 99. In this embodiment, a rolling shutter distortion, which appears as a picture deviation along the scanning lines (in the line direction) between the scanning lines, is to be corrected. Accordingly, in this embodiment, the deviation information has only to indicate the direction (right or left) and amount of the shake along the scanning line, i.e. in the yaw direction. Note that the fluctuation in the direction and amount of the shake may be linear, as shown in FIG. 11, or may also be curved.

As shown in FIG. 12, upon starting imaging live view images (S10), the body controller 67 gives an instruction to start the shake detection to the lens controller 36 through the serial communication unit 94 (S11). In response to the shake detection start instruction from the body controller 67, the lens controller 36 actuates the shake detection sensor 40 to start the shake detection (S12). In addition, depending on whether the OIS switch 31 is on or off, the lens controller 36 transmits mode information indicating whether the shake compensation device 13 is active or inactive through the serial communication unit 90 to the body controller 67 (S13). The mode information on the shake compensation device 13 is transmitted to the body controller 67 in order to inhibit the body controller 67 from executing the second process while the shake compensation device 13 is active, because if the second process is executed while the shake compensation device 13 is active, the live view image would be over-corrected to get a distortion. This transmission of the mode information is carried out at each input of the vertical synchronization signal, i.e., for each frame.

On the basis of the mode information received, the body controller 67 determines whether the shake compensation device 13 is active or inactive (S14). While the shake compensation device 13 is executing the shake compensation (YES in S14), the body controller 67 controls the image data processor 72 to execute the first process (S15). Then the image data processor 72 produces a live view image by cropping a predetermined cropping range 106 from the image signal 105 of each scanning line. While the shake compensation device 13 is active, it is possible to correct a rolling shutter distortion without the second process, if the distortion is a minor one.

The image data processor 72 performs resizing for adjusting the resolution of the live view image produced through the first process to the resolution of the image display unit 24 or the EVF panel 27 (S16). The LCD driver 74 displays the resized live view image on the image display unit 24 or the EVF panel 27 (S17). Unless the live view imaging is interrupted by a start of still image capturing, the body controller 67 returns to the step S14.

When the shake compensation device 13 is inactive (NO in S14), the body controller 67 orders transmission of the deviation information from the lens controller 36 (S19). Then the lens controller 36 calculates the deviation information on the basis of the shake detection signals as shown in FIG. 7, as a parameter that represents the direction and amount of the shake for the presently imaged frame in the form of a linear or multidimensional function (S20). The lens controller 36 transmits the deviation information through the serial communication unit 90 to the body controller 67 in synchronism with the vertical synchronization signal (S21). Unless the body controller 67 gives an instruction to stop the shake detection (NO in S22), the lens controller 36 returns to the step S13. Although the shake detection signals are illustrated to be output at the same timing as the horizontal synchronization signals in FIG. 7, this is for avoiding complicity of the drawing. Actually, a plurality of shake detection signals are output in one horizontal synchronization period. Furthermore, it is unnecessary to synchronize the output timing of the shake detection signal with the horizontal synchronization signal. The same applies to FIG. 20 and FIG. 23.

When the shake compensation device 13 is inactive (NO in S14), the body controller 67 controls the image data processor 72 to execute the second process (S23). Then the image data processor 72 determines a corrected cropping range that is used for producing a live view image while correcting a rolling shutter distortion that occurs in the image signal 105 for each scanning line on the basis of the deviation information (S24).

Figure 13A:
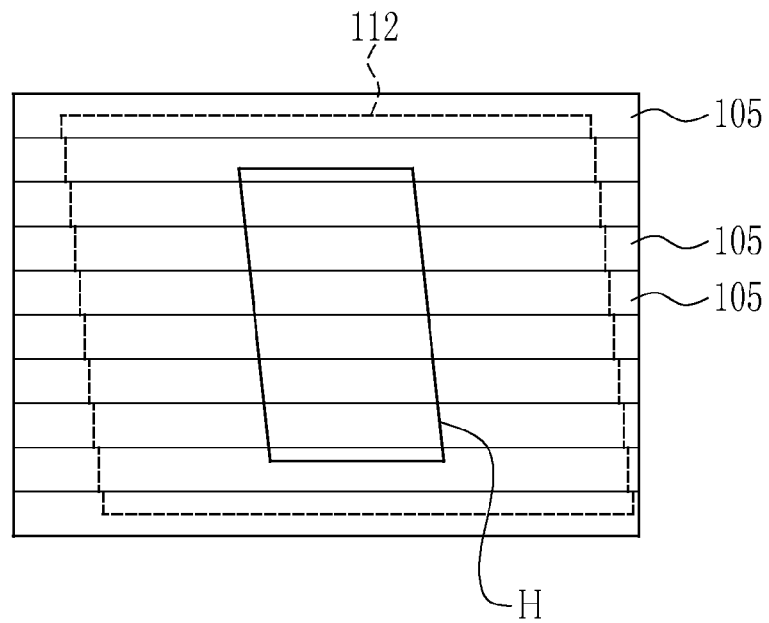
FIG. 13A is an explanatory diagram illustrating a corrected cropping range of image signals in accordance with a second process.

The image data processor 72 shifts a predetermined cropping range 106 from one scanning line to another in the scanning line direction on the basis of the deviation information. For example, the predetermined cropping range 106 shown in FIG. 10 is shifted in the scanning line direction on the basis of the deviation information shown in FIG. 11, thereby to determine a corrected cropping range 112 as shown in FIG. 13A, wherein the cropping range is shifted rightwards from one scanning line to the adjacent scanning line by an amount corresponding to several pixels each.

Figure 13B:
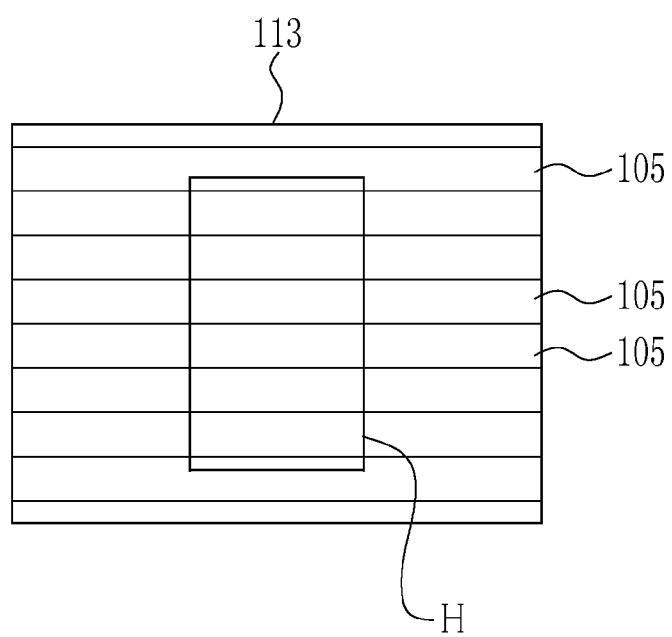
FIG. 13B is an explanatory diagram illustrating a live view image corrected according to the second process.

Then the image data processor 72 crops the line image signal 105 out of the corrected cropping range 112 for each scanning line, and aligns the left margins (pixels) of the cropped line image signals on the respective scanning lines (S25). Thus, as shown in FIG. 13B, a live view image 113 containing a subject H, of which the rolling shutter distortion has been corrected, is produced. The live view image thus produced through the second process is subjected to the resizing process (S16) and thereafter displayed on the image display unit 24 or the EVF panel 27 (S17).

The body controller 67 and the lens controller 36 repeat the steps S13 to S25 until the live view imaging is interrupted by the still image capturing or the like. Thus, the live view image observed on the image display unit 24 or through the electronic viewfinder is corrected to eliminate the rolling shutter distortion.

When the live view imaging is interrupted (YES in S18), the body controller 67 instructs the lens controller 36 to stop the shake detection (S26). Upon the instruction to stop the shake detection (YES in S22), the lens controller 36 stops the shake detection by the shake detection sensor 40 (S27).

According to the above embodiment, the deviation information, which is obtained based on the direction and amount of the shake detected by the shake detection sensor 40, is transmitted from the interchangeable lens 12 to the camera body 11, enabling the camera body 11 to correct the rolling shutter distortion. Furthermore, because the camera body 11 does not need to calculate the shake amount, for example, by comparing the line image signal of one scanning line with another, but the direction and amount of the shake is available from the deviation information, it is possible to display the live view image without delay.

In addition, since the deviation information is a parameter that indicates the fluctuation in the direction and amount of the shake in one frame, the data volume for the deviation information is reduced. This results in taking a shorter time to transmit the deviation information even through the low-speed serial communication, enabling to correct the rolling shutter distortion of the live view image without a delay in displaying the live view image. Moreover, since the second process is not executed while the shake compensation device is active, it is possible to prevent over-correction of the live view image. Since the deviation information is transmitted through an existing serial communication unit, it is unnecessary to provide the camera 10 with a specific communication unit for transmitting the deviation information, which is advantageous for cost-saving.

Hereinafter, another embodiment of the present invention will be described. In respective embodiments as set forth below, the same components will be designated by the same reference numerals as in the first embodiment, and the details of these components will be omitted.

Second Embodiment

The second embodiment is configured to execute the second process even while the shake compensation device 13 is active under certain conditions that will lower the correcting effect on a rolling shutter distortion by the shake compensation device 13. As shown in FIG. 14, after the start of the shake detection (S12), the lens controller 36 starts determinations about a shake compensation limit and the panning (S32). Then, the determination result on the shake compensation limit and the determination result on the panning are transmitted to the body controller 67 through the serial communication unit 90, for example, along with the mode information on the shake compensation device 13 (S33).

For the determination on the shake compensation limit, the amount of a shake detected by the shake detection sensor 40 is compared with the shake compensation limit of the shake compensation device 13, to determine whether the shake amount exceeds the shake compensation limit or not. The shake compensation limit indicates an upper limit of the shake amount, for which the shake compensation device 13, which is constituted of the OIS lens 46, etc., is capable of compensating for the shake. This shake compensation limit is predetermined for each kind of interchangeable lenses 12, and the individual shake compensation limits are stored in a ROM of the lens controller 36, and an appropriate one is read from the ROM for comparison with the shake amount. For a shake of an amount up to the shake compensation limit, the shake compensation device 13 is capable of making the compensation so as to eliminate the picture blur. However, if the shake amount exceeds the shake compensation limit, the compensation by the shake compensation device 13 could not sufficiently reduce the picture blur. Therefore, it is preferable to execute the second process when the shake amount exceeds the shake compensation limit.

Figure 15:
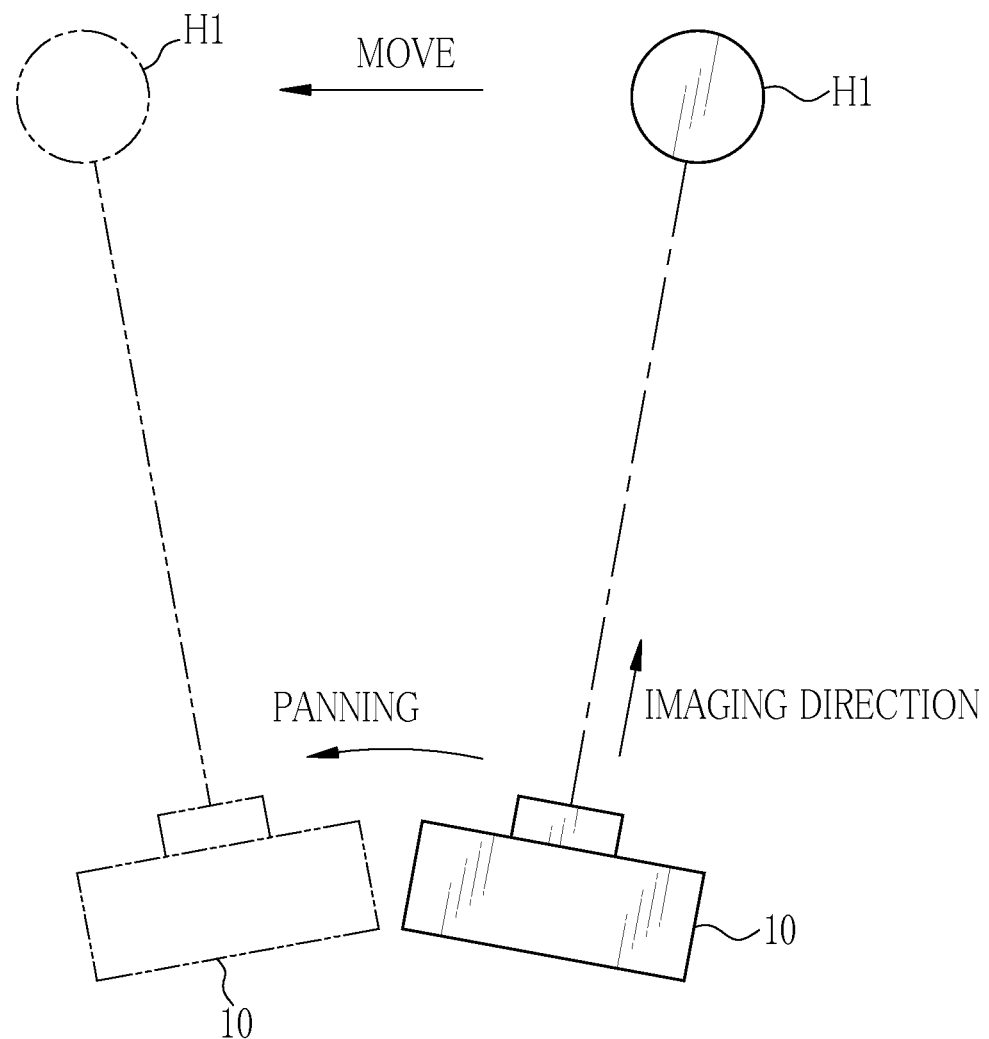
FIG. 15 is an explanatory diagram illustrating the panning operation.

The determination on the panning is to determine whether or not the camera 10 is swung to the left or right in order to direct the imaging field to a subject Hl that is moving in the horizontal direction, as shown in FIG. 15. The shake compensation by the shake compensation device 13 is made by moving the OIS lens 46 in the light path perpendicularly to the optical axis S, and is capable of correcting a blur due to a small fluctuation of the camera 10 such as the camera shake, but is not capable of compensating for a large camera motion such as the panning. Since the live view image may suffer from a rolling shutter distortion due to the panning of the camera 10, it is preferable to execute the second process during the panning.

In an example, the lens controller 36 compares the amount of a shake in a pitching direction (the amount of movement of the camera 10 around the X-axis (refer to FIG. 1)) with the amount of a shake in the yaw direction (the amount of movement of the camera 10 around the Z-axis (refer to FIG. 1)), which are detected by the shake detection sensor 40. The lens controller 36 determines that the panning is carried out if the shake amount in the yaw direction is continuously larger than the shake amount in the pitching direction.

When the shake compensation device 13 is active (YES in S14), the body controller 67 refers to the determination result on the shake compensation limit, which is received from the interchangeable lens 12. If the determination result indicates that the amount of the detected shake exceeds the shake compensation limit (YES in S30), the body controller 67 controls the image data processor 72 to execute the second process (S23) because it is impossible to correct a rolling shutter distortion sufficiently by the shake compensation device 13. When the shake amount exceeds the shake compensation limit, the effect of correcting the rolling shutter distortion by the shake compensation device becomes relatively small; therefore, making the second process in addition to the shake compensation would not result in over-correction.

It is to be noted that the lens controller 36 may produce the deviation information before receiving an instruction to transmit the deviation information from the body controller 67 if the shake amount is determined to exceed the shake compensation limit or if it is determined that the panning is carried out. This is because, in these cases, the body controller 67 is presumed to instruct the transmission of the deviation information after the transmission of the determination result.

Meanwhile, if the determination result on the shake compensation limit indicates that the shake amount is less than the shake compensation limit (NO in S30), the body controller 67 refers to the determination result on the panning. If the determination result on the panning indicates that the panning is carried out (YES in S31), the image data processor 72 is controlled to execute the second process (S23) because, in that case, the shake compensation device 13 is not capable of correcting the rolling shutter distortion sufficiently. Also during the panning, since the effect of correcting the rolling shutter distortion by the shake compensation device 13 becomes relatively small, the second process in addition to the shake compensation would not result in over-correction.

When the shake compensation device 13 is active (YES in S14) and if the determination result on the shake compensation limit indicates that the shake amount does not exceed the shake compensation limit (NO in S30) and the determination result on the panning indicates that no panning is carried out (NO in S31), the body controller 67 controls the image data processor 72 to execute the first process (S15).

The reason why the first process is executed when the shake amount is less than the shake compensation limit and no panning is carried out is because, in that case, the shake compensation device 13 could reduce the rolling shutter distortion so much that such a correction accuracy that is achieved by the second process is unnecessary.

In addition, because the second process requires high-speed processing that consumes much power for producing the deviation information on the basis of the shake detection signal and transmitting the deviation information in synchronism with the vertical synchronization signal, it is preferable to apply the first process to a case where the high correction accuracy of the second process is unnecessary.

According to the second embodiment, the second process is executed even while the shake compensation device is active under such conditions where the effect of correcting the rolling shutter distortion by the shake compensation device is not sufficient, enabling to properly correct the rolling shutter distortion.

In the second embodiment, the shake amount is compared with the shake compensation limit to switch over between the first process and the second process when the shake compensation device is active. Alternatively, it is possible to compare the shake amount with the shake compensation limit to switch over between the first and second processes, regardless of the mode of the shake compensation device. Likewise, it is possible to determine whether the panning is carried out or not, regardless of the mode of the shake compensation device and the shake amount, although the determination on the panning is performed in the second embodiment when the shake compensation device is active and the shake amount is less than the shake compensation limit.

In addition, although the second embodiment is configured to perform the determination on the shake compensation limit and the determination on the panning on the side of the interchangeable lens and transmit the respective determination results to the camera body side, it is alternatively possible to perform the determination on the shake compensation limit and the determination on the panning on the camera body side on the basis of the deviation information from the interchangeable lens. In this case, the lens controller should produce deviation information indicating the direction and amount of the shake with respect to both the pitching direction and the yaw direction, and transmit the deviation information to the body controller. Needless to say, the deviation information must be transmitted from the interchangeable lens side to the camera body side before the determination on the shake compensation limit and the determination on the panning are performed on the camera body side in this case. For example, the deviation information may be transmitted with the operating conditions through the serial communication.

Third Embodiment

Figure 16:
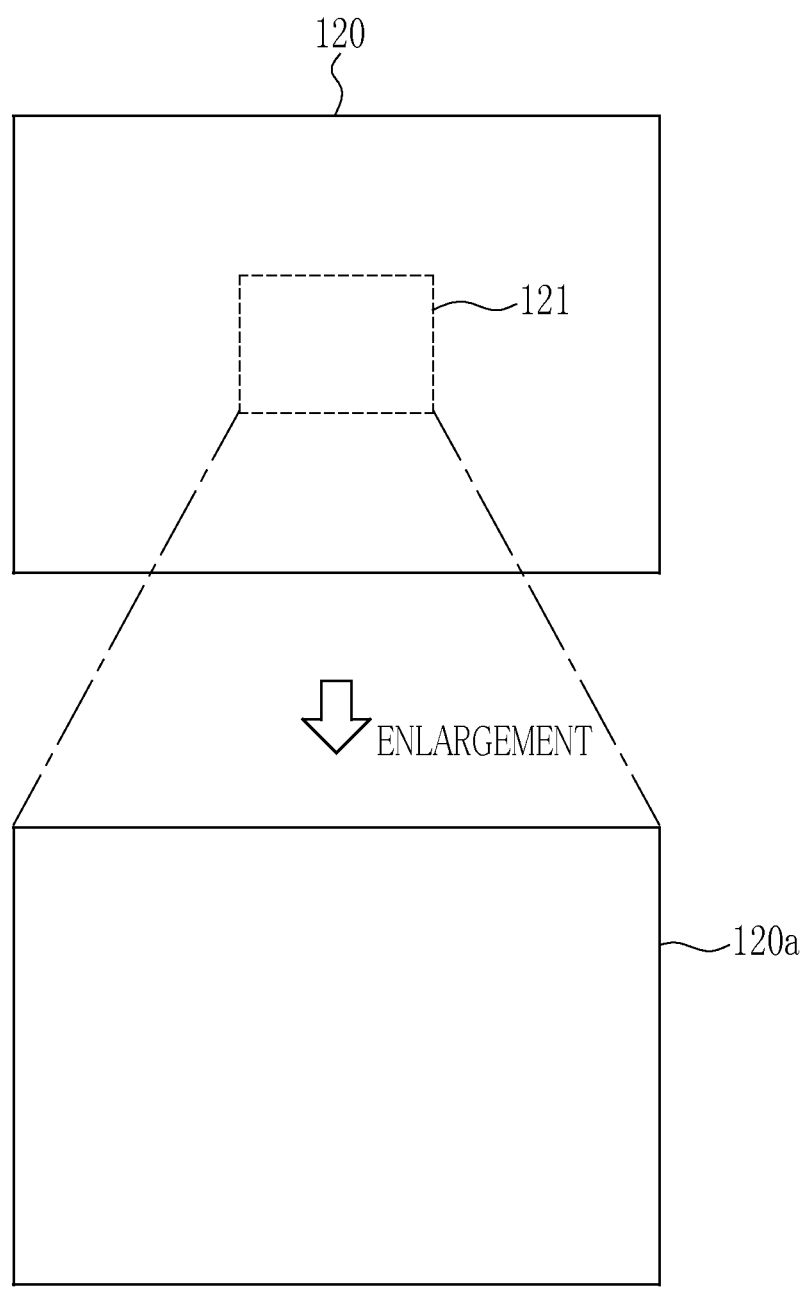
FIG. 16 is an explanatory diagram illustrating a live view image having a part thereof enlarged by electronic zooming.

The third embodiment is configured to switch over between the first and second processes depending upon the operating conditions of the electronic zooming. As shown in FIG. 16, the electronic zooming is performed by the image data processor 72, cropping an image part from a live view image 120 within a zooming zone 121, which is determined according to a zoom magnification designated by the zooming operation, and enlarging the cropped image part to be displayed as a live view image 120a on the image display unit 24. As the image part within the zooming zone 121 is enlarged for the electronic zooming, also a rolling shutter distortion would be enlarged. Even while the rolling shutter distortion before the enlargement is in such a degree that does not need a correction, the enlarged distortion may have to be corrected. Therefore, during the electronic zooming, there may be cases requiring the second process.

Figure 17:
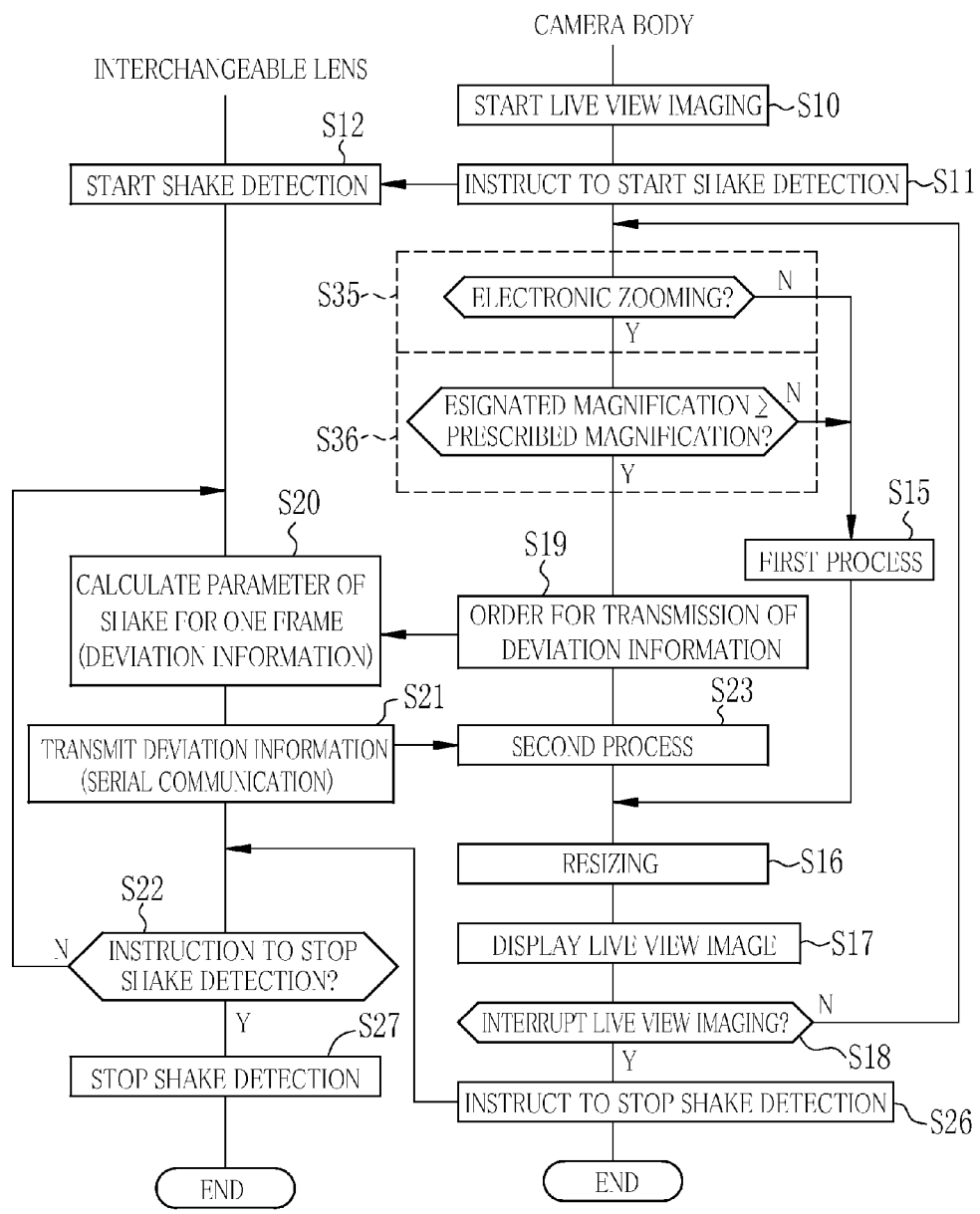
FIG. 17 is a flowchart illustrating an imaging procedure for live view images in accordance with a third embodiment.

According to the third embodiment, as shown in FIG. 17, the body controller 67 monitors the zooming operation on the operation button 25 to determine whether the electronic zooming is performed or not (S35) after instructing the lens controller 36 to start the shake detection. In this embodiment, it is possible to determine that the electronic zooming is not performed when the zoom magnification is "1", and that the electronic zooming is performed when the zooming magnification is above "1".

The body controller 67 controls the image data processor 72 to execute the first process (S15) while no operation for the electronic zooming is performed (NO in S35). When the operation button 25 is operated for zooming (YES in S35), the body controller 67 compares a zoom magnification designated by the operation button 25 (hereinafter referred to as the designated magnification) with a prescribed magnification (S36). The prescribed magnification is a zoom magnification beyond which the second process becomes necessary for correcting the rolling shutter distortion. The prescribed magnification is previously set up and stored in the ROM of the body controller 67, and is read out from the ROM for comparison with the designated magnification.

When the designated magnification is less than the prescribed magnification (NO in S36), the body controller 67 controls the image data processor 72 to execute the first process (S15). When the designated magnification is not less than the prescribed magnification (YES in S36), the shake compensation device 13 is not capable of correcting the rolling shutter distortion sufficiently, and hence the body controller 67 orders the lens controller 36 to transmit the deviation information (S19), and controls the image data processor 72 to execute the second process (S23). After the first or the second process, a resizing process including the electronic zooming is carried out (S16). Since the effect of correcting the rolling shutter distortion by the shake compensation device 13 becomes relatively small in the live view image enlarged through the electronic zooming, the second process in addition to the shake compensation by shake compensation device 13 would not result in over-correction.

According to the third embodiment, the second process is executed when the designated magnification of the electronic zooming is not less than the prescribed magnification, enabling to properly correct the rolling shutter distortion that is enlarged by the electronic zooming. Note that the third embodiment may be combined with the first embodiment wherein the first and second processes are switched on the basis of the mode of the shake compensation device, or may be combined with the second embodiment wherein the first and second processes are switched on the basis of the mode of the shake compensation device, the shake compensation limit and the panning.

Fourth Embodiment

Figure 18:
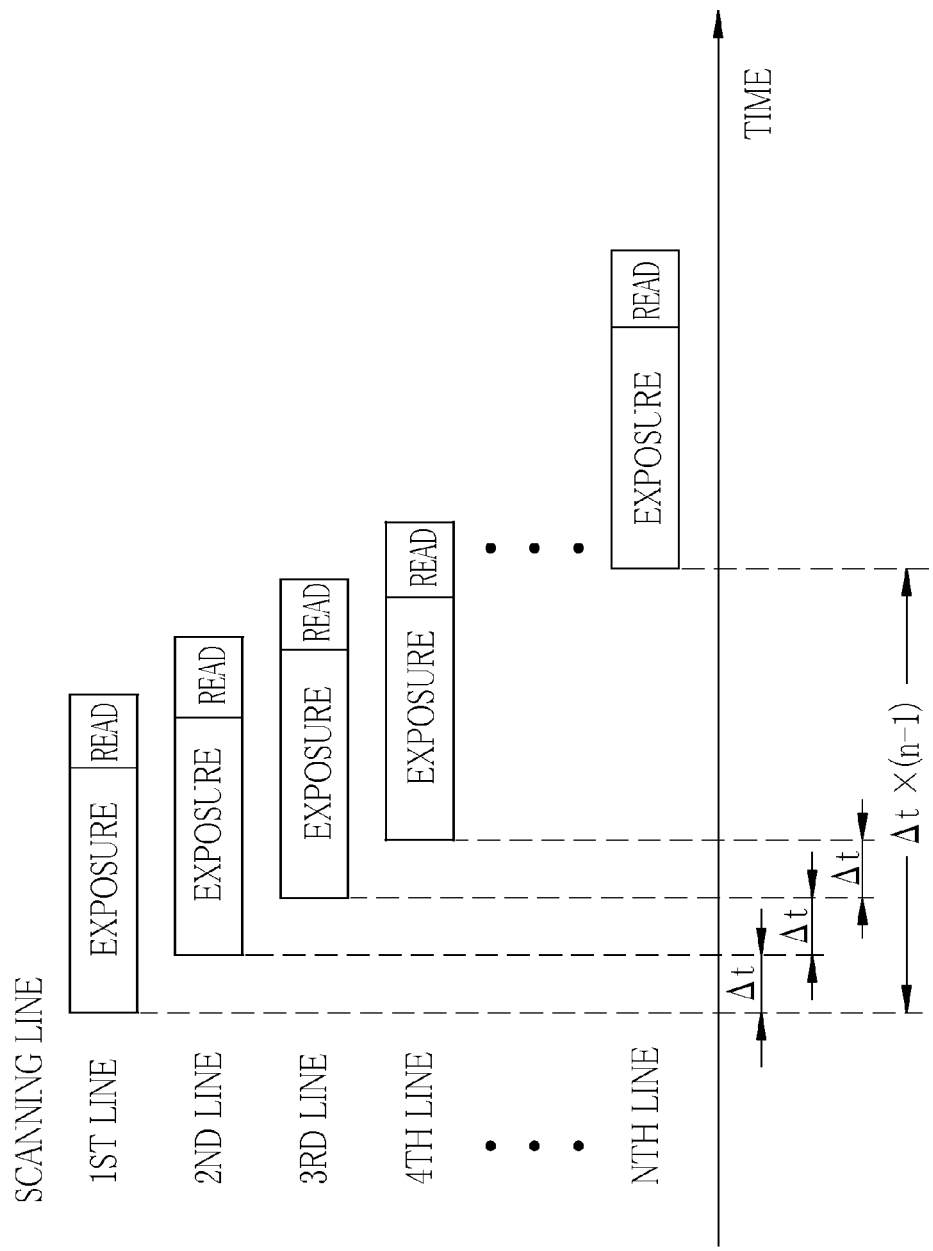
FIG. 18 is an explanatory diagram illustrating the shift of exposure timing between scanning lines at a higher frame rate.

As a method for reducing the rolling shutter distortion, employing a higher frame rate of the CMOS sensor 21 is known. The frame rate represents the number of frames per second, which the CMOS sensor 21 is able to acquire, and it is possible to increase the frame rate, for example, by using a shorter time for each reading operation on each scanning line. For example, the reading time for each scanning line is shortened in the operation of the CMOS sensor 21 shown in FIG. 18, thereby to increase the frame rate in comparison with the operation shown in FIG. 8. By increasing the frame rate this way, the time lag $\Delta t$ in the exposure time between the scanning lines is reduced, and thus the rolling shutter distortion is minimized as compared to the case employing a lower frame rate. The fourth embodiment is focused on the relationship between the frame rate and the rolling shutter distortion, and is configured to switch over the first process and the second process depending on the frame rate.

Figure 19:
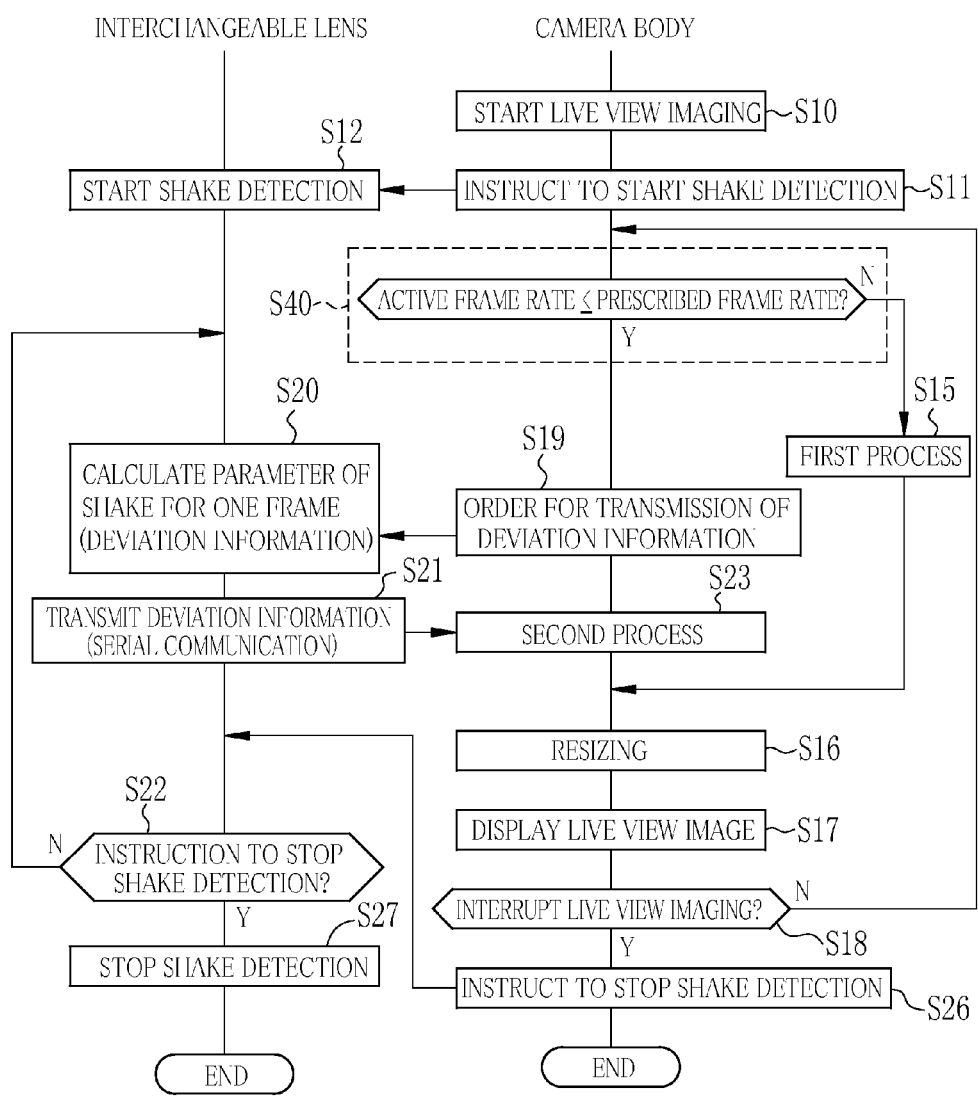
FIG. 19 is a flowchart illustrating an imaging procedure for live view images in accordance with a fourth embodiment.

In the fourth embodiment, as shown in FIG. 19, the body controller 67 compares an actual frame rate of the CMOS sensor 21 with a prescribed frame rate (S40) after instructing the lens controller 36 to start the shake detection. The actual frame rate is a frame rate set up for operating the CMOS sensor 21. The prescribed frame rate is a frame rate beyond which the second process becomes necessary for correcting the rolling shutter distortion, and preset and stored in the ROM of the body controller 67. The prescribed frame rate is read out from the ROM for comparison with the actual frame rate.

When the actual frame rate is higher than the prescribed frame rate (NO in S40), the shake compensation device 13 reduces the rolling shutter distortion, so the body controller 67 controls the image data processor 72 to execute the first process (S15). When the actual frame rate is lower than the prescribed frame rate (YES in S40), the shake compensation device 13 does not sufficiently correct the rolling shutter distortion, so the body controller 67 orders the lens controller 36 to transmit the deviation information (S19) and then controls the image data processor 72 to execute the second process (S23). When the actual frame rate is low, the rolling shutter distortion would be relatively large, so the second process in addition to the compensation by the shake compensation device 13 would not result in over-correction.

According to the fourth embodiment, the second process is executed when the actual frame rate is not higher than the prescribed frame rate, so that it is possible to correct the rolling shutter distortion properly even if the distortion is enhanced due to a low actual frame rate. Note that the fourth embodiment may be combined with any of the methods for controlling switching between the first process and the second process according to the first to third embodiments.

Fifth Embodiment

Figure 20:
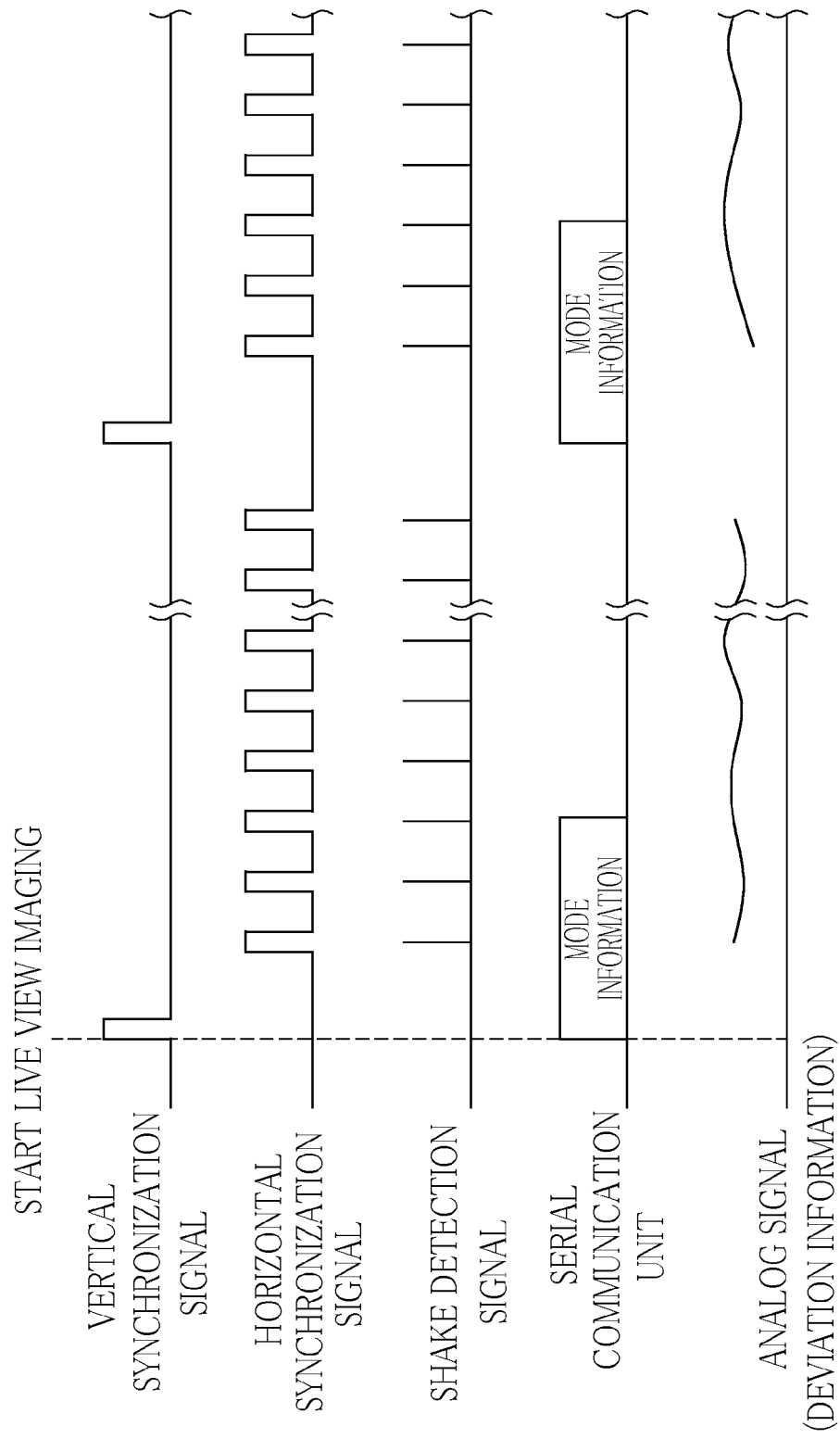
FIG. 20 is a timing chart illustrating various signals during the imaging of live view images in accordance with a fifth embodiment.
Figure 21:
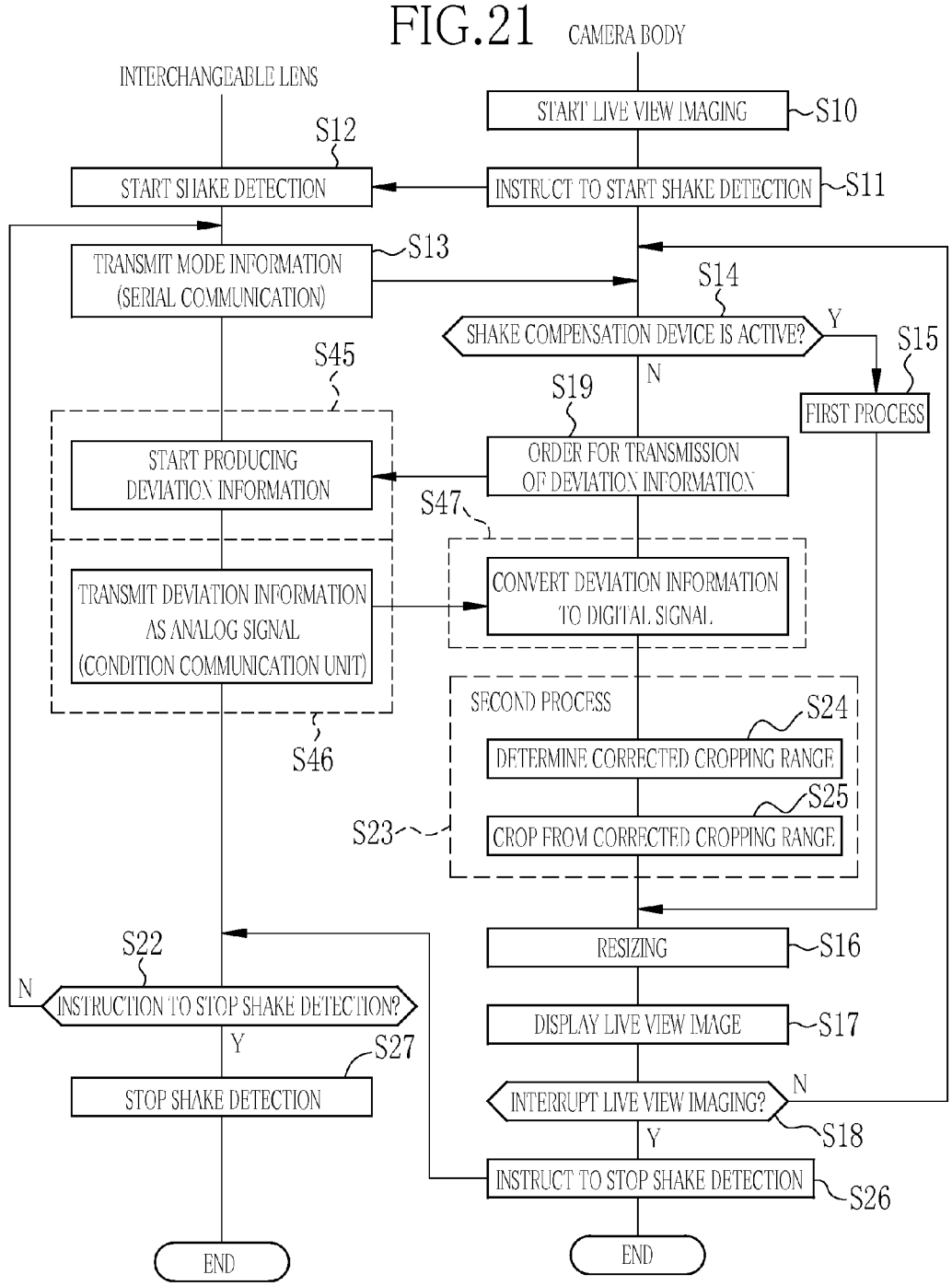
FIG. 21 is a flowchart illustrating an imaging procedure for live view images in accordance with the fifth embodiment.

The fifth embodiment is configured to transmit the deviation information from the interchangeable lens 12 to the camera body 11 in the form of an analog signal, using the condition communication unit consisting of the DAC output section 87, the universal mutual communication lines 55 and the ADC input section 91 (the analog communication unit). As shown in FIG. 20 and FIG. 21, the mode information on the shake compensation device 13 is transmitted from the lens controller 36 to the body controller 67 through the serial communication unit 90, the serial communication lines 57 and the serial communication unit 94 (S13) in the present embodiment, as with the first embodiment.

When the shake compensation device 13 is inactive (NO in S14), the body controller 67 orders the lens controller 36 to transmit the deviation information (S19). In response to this order, the lens controller 36 sequentially produces the deviation information indicating the direction and amount of the shake on the basis of the shake detection signals (S45). Each time the deviation information is produced, the deviation information is converted to an analog signal through the DAC output section 87 and is sequentially transmitted to the body controller 67 through the universal mutual communication lines 55 and the ADC input section 91 (S46).

The ADC input section 91 samples the received analog signal at the timing synchronized with the horizontal synchronization signal, to sequentially reconvert the deviation information to a digital signal (S47). Thus, the deviation information corresponding to each individual scanning line is sequentially transmitted from the DAC output section 87 to the ADC input section 91 in the form of an analog signal. For example, the DAC output section 87 converts the deviation information to an analog signal having a voltage amplitude (signal level) corresponding to the direction and amount of the shake. More specifically, the shake information is converted to the analog signal in such a manner that an intermediate level of the voltage amplitude is assigned to no shake condition (shake amount "0"), the direction of the shake is indicated by the increase or decrease of the voltage amplitude from the intermediate level, and the amount of the shake is represented by the difference in amplitude from the intermediate level. The ADC input section 91 derives the shake direction from the relative magnitude of the voltage amplitude of the sampled analog signal to the intermediate level, and derives the shake amount from the difference of the voltage amplitude from the intermediate level. Note that the method for converting the deviation information to an analog signal is not to be limited to the above method.

On the basis of the deviation information as being converted to a digital signal, the image data processor 72 determines a corrected cropping range (S24) and crops the image signal 105 from the corrected cropping range on each scanning line, to produce a live view image (S25). When the shake compensation device 13 is inactive (YES in S14), the body controller 67 executes the first process (S15), as with the first embodiment.

According to the fifth embodiment, the deviation information is transmitted to the camera body 11 in a real time fashion through the analog communication unit consisting of the DAC output section 87, the universal mutual communication lines 55 and the ADC input section 91, which is faster than the serial communication unit 90; thus, it is possible to correct the rolling shutter distortion while preventing the delay in displaying the live view image. Since the deviation information relating to each scanning line is used for correcting the rolling shutter distortion of the live view image, it is possible to correct the rolling shutter distortion more accurately as compared to the first embodiment wherein the correction is carried out on the basis of the deviation information for one frame, which is derived from a plurality of shake detection signals. Furthermore, using the existing analog communication unit for transmitting the deviation information eliminates the need for providing the camera 10 with a specific communication unit for transmitting the deviation information, and thus reduces the cost advantageously.

In order to correct the rolling shutter distortion with high accuracy, it may be possible to calibrate the analog signal from the DAC output section 87 so as the signal level (voltage) of the analog signal to be constant relative to the deviation information, for example, at the time of actuating the camera 10.

In a case where the DAC output section 87, the universal mutual communication lines 55 and the ADC input section 91 are used for informing of the driving conditions of the AF operation, the transmission of the deviation information is impossible while the driving conditions of the AF operation is being informed. In that case, it is preferable to switch over between the first and second processes according to the operation on the release switch 15. As mentioned above, the driving conditions of the AF operation is informed only while the release switch 15 is half-pressed to make the AF operation, the DAC output section 87, the universal mutual communication lines 55 and the ADC input section 91 are available for transmission of the deviation information unless the release switch 15 is half-pressed.

Figure 22:
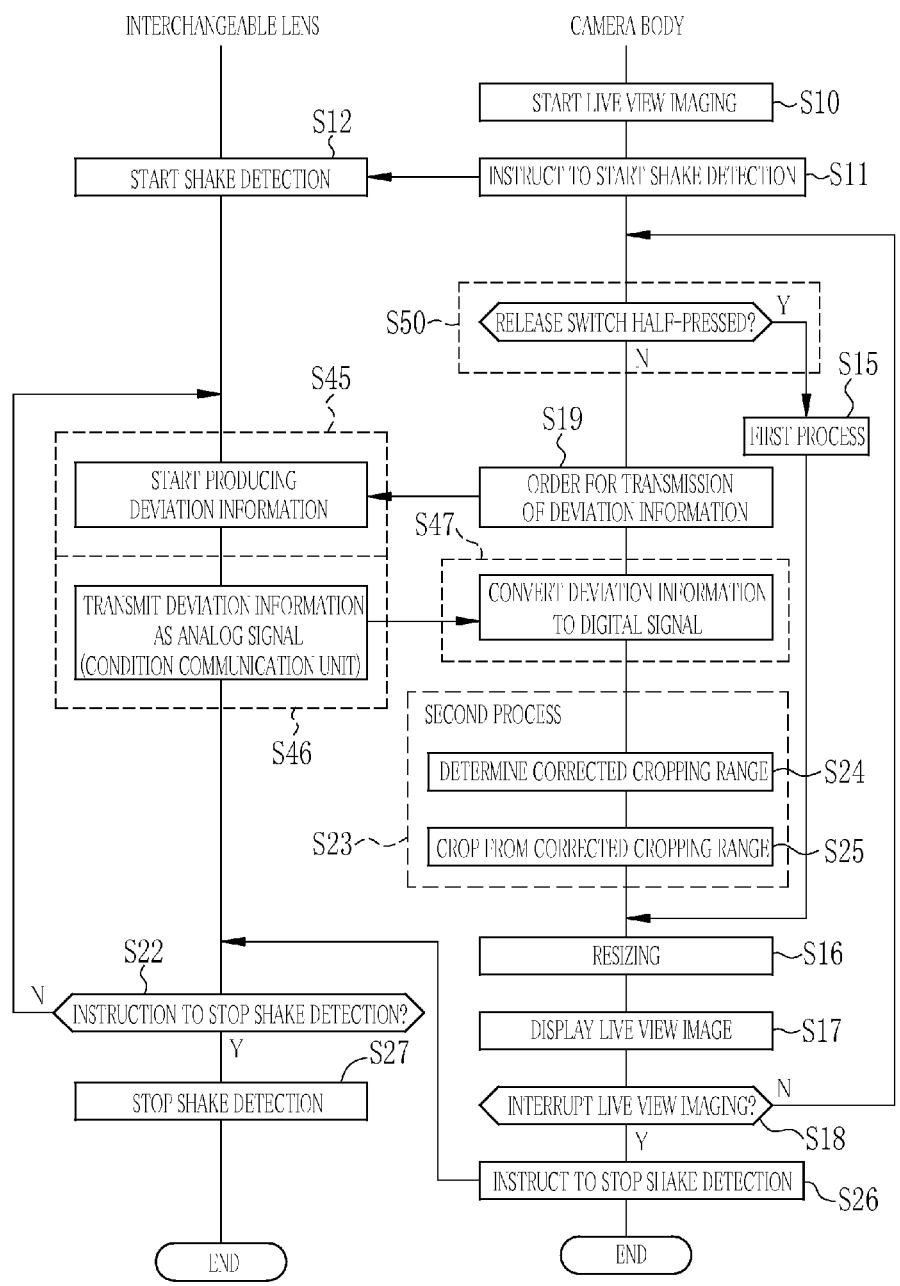
FIG. 22 is a flowchart illustrating another imaging procedure for live view images in accordance with the fifth embodiment.

As shown in FIG. 22, the body controller 67 controls the image data processor 72 to execute the first process (S15) while the release switch 15 is half-pressed (S1-ON signal) (YES in S50). When the half-press of the release switch 15 is released (S1-OFF signal or S2-ON signal) (NO in S50), the body controller 67 orders the lens controller 36 to transmit the deviation information (S19), and controls the image data processor 72 to execute the second process (S23). This configuration makes it possible to use the condition communication unit consisting of the DAC output section 87, the universal mutual communication lines 55 and the ADC input section 91 effectively for informing the driving conditions of the AF operation and transmitting the deviation information.

Note that the fifth embodiment may be combined with any of the methods for controlling switching between the first and second processes according to the second to fourth embodiments.

Sixth Embodiment

The sixth embodiment is configured to use the condition communication unit which consists of the timer output section 88, the universal mutual communication lines 55 and the timer input/output section 93 (the pulse width modulation communication unit) for transmitting the deviation information in the form of a PWM signal from the interchangeable lens 12 to the camera body 11. In the present embodiment, as shown in FIG. 23 and FIG. 24, the mode information of the shake compensation device 13 is transmitted from the lens controller 36 to the body controller 67 through the serial communication unit 90, the serial communication lines 57 and the serial communication unit 94, as with the first embodiment.

When the shake compensation device 13 is inactive (NO in S14), the body controller 67 orders the lens controller 36 to transmit the deviation information (S19). Then, the lens controller 36 sequentially produces the deviation information on the basis of the shake detection signal that indicates the direction and amount of the shake (S45). Each time the deviation information is produced, the lens controller 36 determines a duty ratio of the PWM signal according to the direction and amount of the shake indicated by the deviation information (S55). The timer output section 88 converts the deviation information to the PWM signal on the basis of the determined duty ratio and sequentially transmits the PWM signal to the body controller 67 through the universal mutual communication lines 55 (S56).

The body controller 67 receives the PWM signal at the timer input/output section 93 at the timing synchronized with the horizontal synchronization signal, and reads the deviation information from the duty ratio of the PWM signal (S57). This way, the deviation information corresponding to each scanning line is converted to a duty ratio, and the PWM signal of this duty ratio is sequentially transmitted from the timer output section 88 to the timer input/output section 93. For example, the lens controller 36 determines the duty ratio of the PWM signal in such a manner that no shake condition (shake amount "0") is assigned to the intermediate duty ratio (50%), the shake direction is indicated by the increase or decrease of the duty ratio from the intermediate value, and the shake amount is represented by the difference from the intermediate duty ratio. Thus, the body controller 67 derives the shake direction from the relative magnitude of the duty ratio of the received PWM signal, and the shake amount from the difference of the duty ratio of the PWM signal from the intermediate value.

Figure 23:
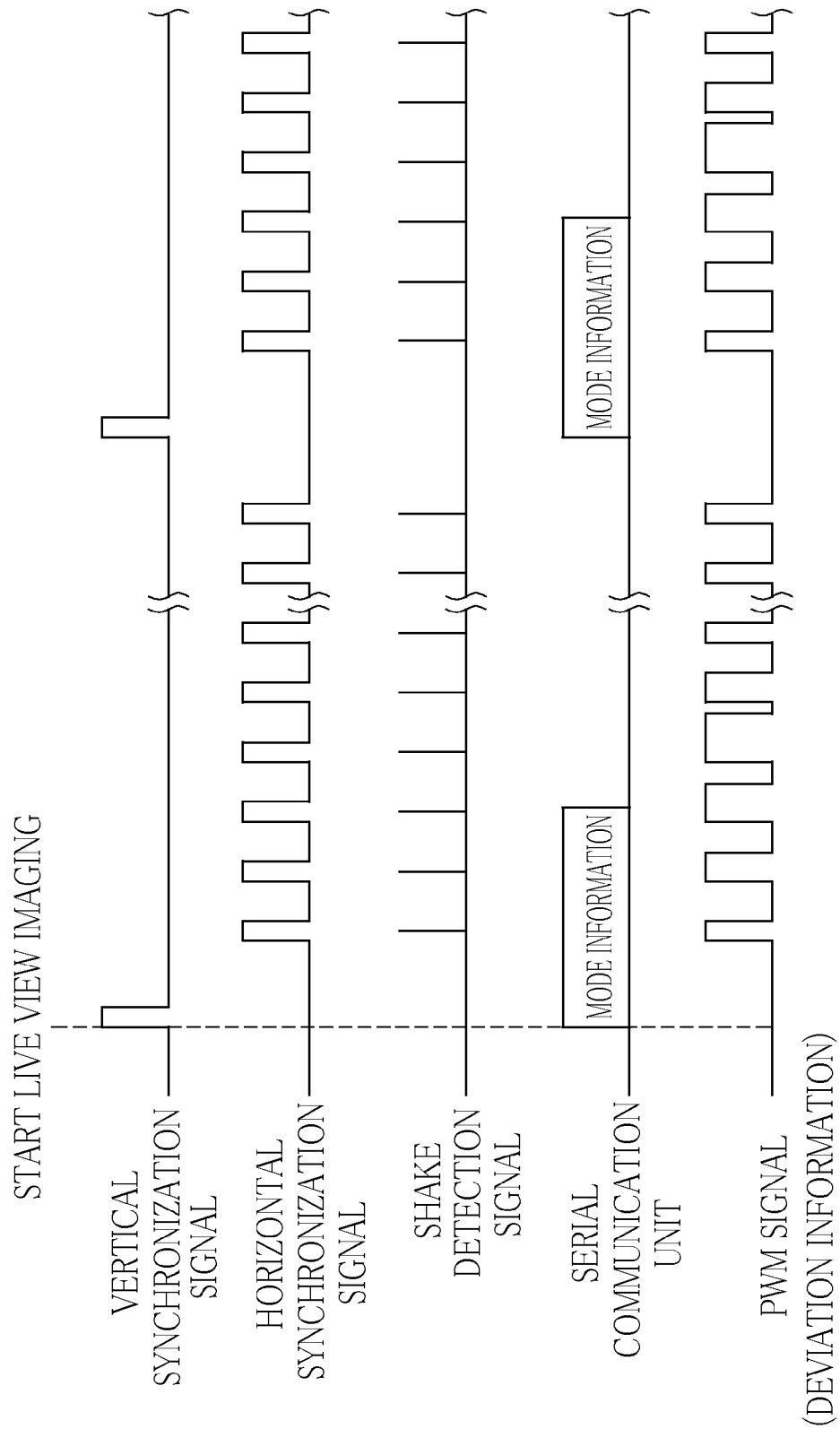
FIG. 23 is a timing chart illustrating various signals during the imaging of live view images in accordance with a sixth embodiment.
Figure 24:
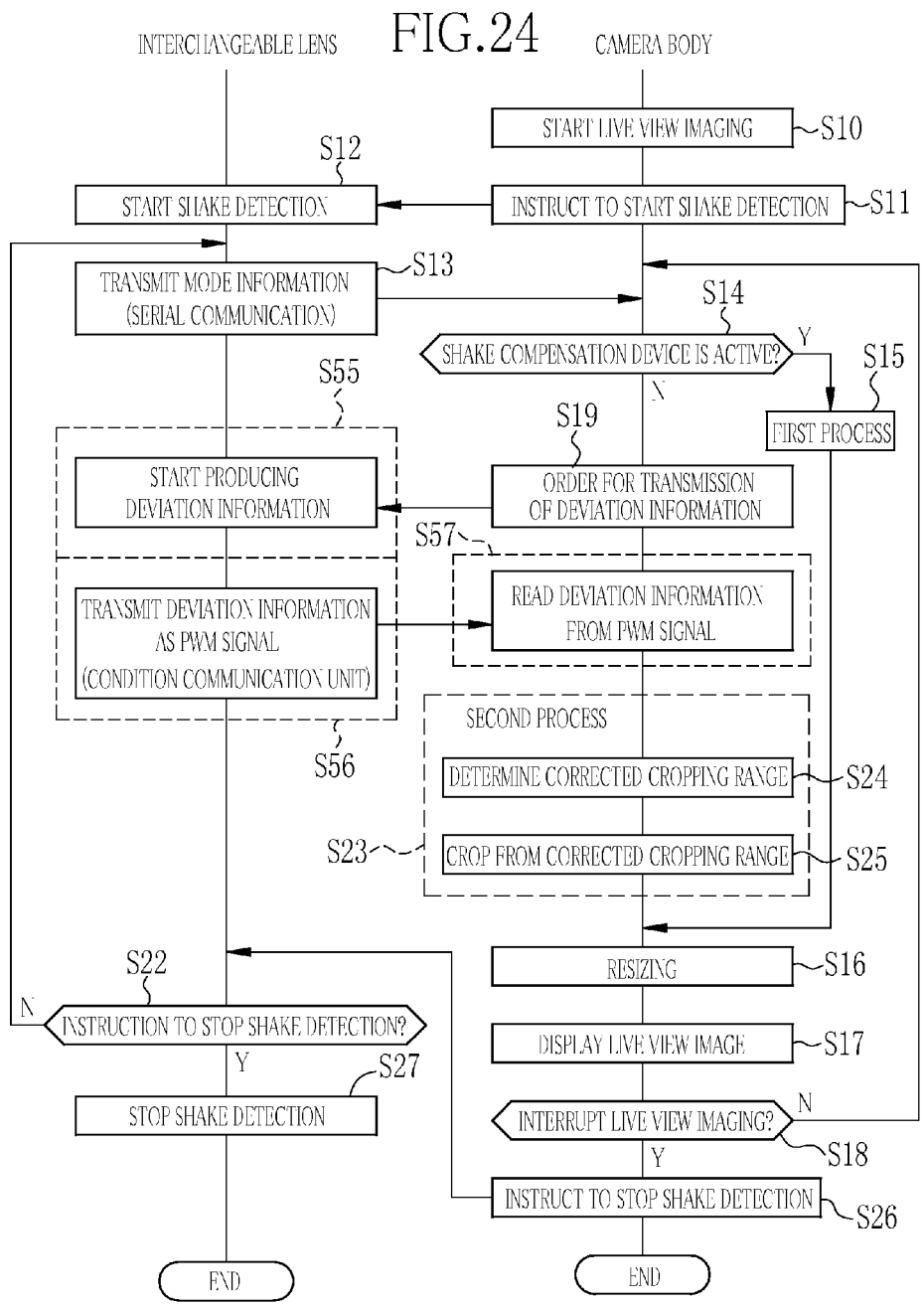
FIG. 24 is a flowchart illustrating an imaging procedure for live view images in accordance with the sixth embodiment.

In FIG. 23, the pulses of the PWM signal are modulated and output in synchronism with the horizontal synchronization signal, that is, the frequency of the horizontal synchronization signal and the carrier frequency of the PWM signal are illustrated to be equal to each other, but this is for brevity shake. The PWM signal may have a higher carrier frequency than the frequency of the horizontal synchronization signal, so that the deviation information for a plurality of scanning lines may be transmitted in one horizontal synchronization period. The method for converting the deviation information to the PWM signal is not to be limited to the above method.

In the second process, the image data processor 72 determines a corrected cropping range on the basis of the deviation information read from the PWM signal (S24), and crops the image signal 105 line by line from the corrected cropping range, to produce a live view image (S25). When the shake compensation device 13 is inactive (YES in S14), the body controller 67 executes the first process (S15), as with the first embodiment.

According to the sixth embodiment, the deviation information is transmitted to the camera body 11 in a real time fashion through the PWM communication unit consisting of the timer output section 88, the universal mutual communication lines 55 and the timer input/output section 93, which is faster than the serial communication unit 90; thus, it is possible to correct the rolling shutter distortion with high accuracy, while preventing the delay in displaying the live view image, as with the fifth embodiment.

In order to correct the rolling shutter distortion with high accuracy, it may be possible to calibrate the settings for the modulation in relation to the deviation information in the timer output section 88, for example, at the time of actuating the camera 10. The present embodiment may also be combined with any of the methods for controlling switching between the first and second processes according to the second to fourth embodiments.

Seventh Embodiment

Figure 25:
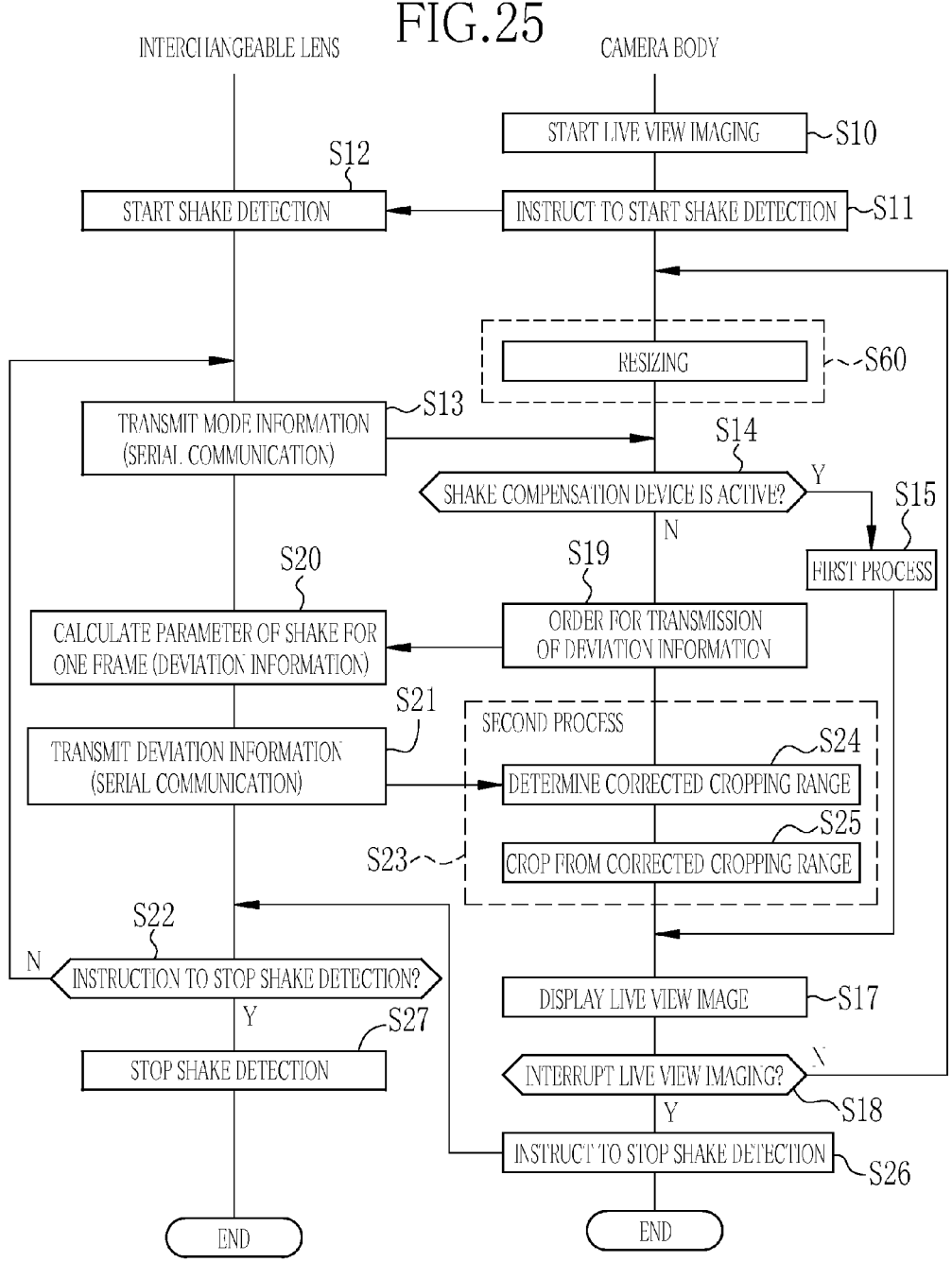
FIG. 25 is a flowchart illustrating an imaging procedure for live view images in accordance with a seventh embodiment.

Although the first or the second process is executed before resizing the live view image in the first embodiment, the resizing (S60) is executed before the first or the second process in the present embodiment, as shown in FIG. 25.

Since the CMOS sensor 21 has a large number of pixels, the size of a live view image just after being read out from the CMOS sensor 21 is too large. Therefore, as shown in FIG. 26(A), a live view image 125 just after being read out from the CMOS sensor 21 is resized to be a live view image 126 of a remarkably smaller size, as shown in FIG. 26(B). As a result, the number of horizontal scanning lines 126a of the live view image 126 is reduced in comparison with the number of scanning lines 125a of the live view image 125 before the resizing, and the loads on the first and second processes are reduced.

Eighth Embodiment

The first or the second process is executed before the resizing of the live view image in the first embodiment, whereas the first or the second process is executed after the resizing in the seventh embodiment. According to the eighth embodiment, the first or the second process is executed selectively before or after the resizing.

As set forth in the seventh embodiment, the number of horizontal scanning lines of the live view image is generally reduced by the resizing. However, because the CMOS sensor 21 allows reading the image signal from an arbitrary pixel 99, there is a digital camera that reads the image signal while thinning the scanning lines during the live view imaging in order to reduce the load of processing. As shown in FIG. 27(A), a live view image 130 based on the image signal read out from the thinned scanning lines is elongated because of the reduced number of horizontal scanning lines 130a. When resizing this live view image 130 so as to accord with the resolution of the image display unit 24, the scanning lines are interpolated, so that a resized live view image 131 will have an increased number of horizontal scanning lines 131a, as shown in FIG. 27(B). In that case, if the distortion correction is executed after the resizing, as with the seventh embodiment, the processing load will be increased as compared to the load of distortion correction before the resizing.

Figure 28:
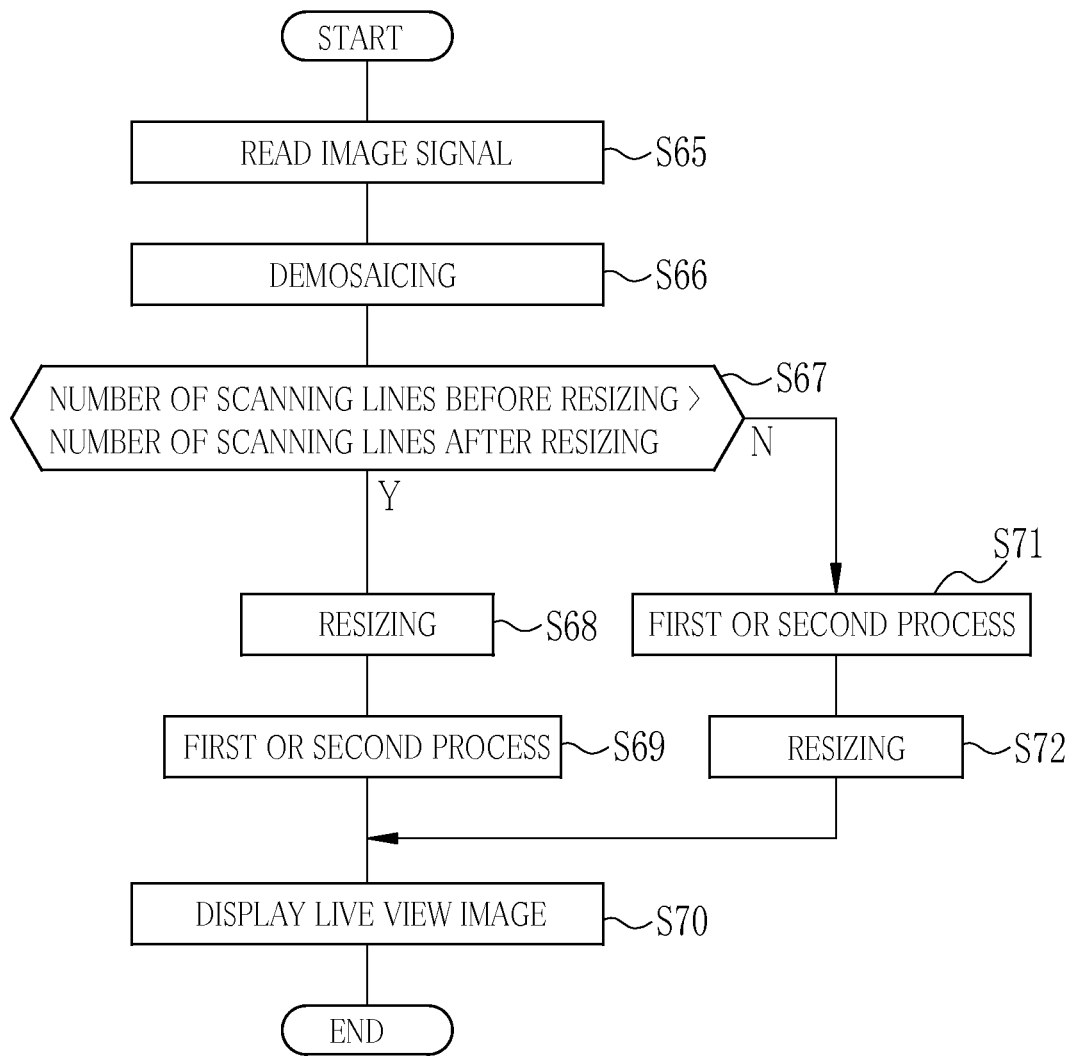
FIG. 28 is a flowchart illustrating a procedure for producing a live view image in accordance with an eighth embodiment.

In the eighth embodiment, as shown in FIG. 28, an image signal for one frame of a live view image is read out from the CMOS sensor 21 (S65) and the image signal is subjected to demosaicing (S66). Then, the number of scanning lines of the live view image before resizing is compared with the estimated number of scanning lines of a live view image after the resizing (S67). Note that demosaicing is a process of calculating color information of all colors on each pixel of a mosaic image corresponding to a color filter array (CFA) of a single-plate image sensor, and is also known as CFA interpolation or color reconstruction.

If the number of scanning lines before resizing is higher than the number of scanning lines after the resizing (YES in S67), the resizing is executed (S68) before the first or the second process (S69). The live view image undergone the first or the second process is displayed on the image display unit 24, etc. (S70) by the LCD driver 74. If the number of scanning lines before resizing is not higher than the number of scanning lines after the resizing (NO in S67), the first or the second process is executed (S71) before the resizing (S72). According to the eighth embodiment, the first or the second process is always performed on a live view image that has a smaller number of scanning lines, making it possible to reduce the load of the first or the second process.

Ninth Embodiment

The ninth embodiment relates to the second process during the electronic zooming. As described with reference to FIG. 9, FIG. 13A and FIG. 13B, the second process is determining a corrected cropping range by shifting a predetermined cropping range 106 in the scanning line direction from one scanning line to another on the basis of the deviation information, and cropping the image signal from the corrected cropping range to produce a live view image from the cropped image signal. Therefore, the live view image before the correction needs a peripheral image area for determining the corrected cropping range around the predetermined cropping range 106.

Figure 29:
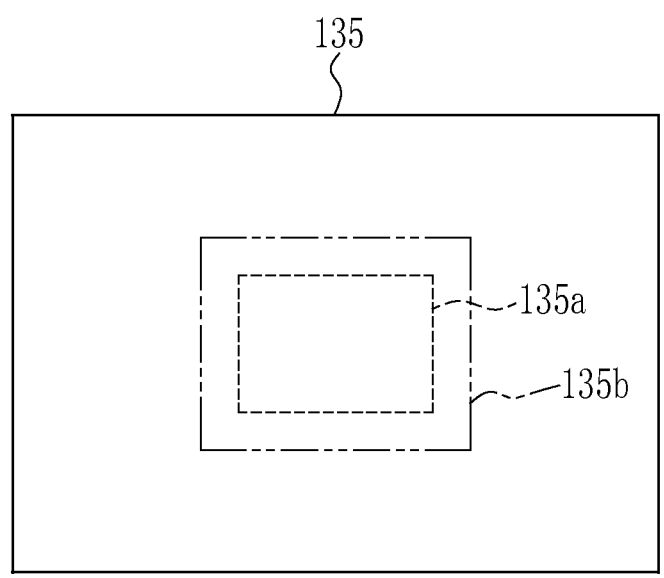
FIG. 29 is an explanatory diagram illustrating an extended zooming zone defined around the periphery of a zooming zone in accordance with a ninth embodiment.

Accordingly, in the ninth embodiment as shown in FIG. 29 and FIG. 30, the image data processor 72 determines an extended zooming zone 135b on the live view image 135 when the operation button 25 is operated for zooming and the size of a zooming zone 135a is determined according to the zoom magnification of the electronic zooming (S80). The extended zooming zone 135b is determined by adding a necessary area for the second process to the periphery of the zooming zone 135a, that is, by adding an area allowing for setting up a corrected cropping range in relation to the zooming zone 135a (S81). The image data processor 72 executes the second process to determine the corrected cropping range to the zooming zone 135a using image signals in the extended zooming zone 135b (S82), and thereafter performs the resizing including the electronic zooming by cropping an image part from the corrected cropping range to the zooming zone 135a and enlarging the cropped image part (S83). The resited image is displayed as a live view image on the image display unit 24 (S84). According to the ninth embodiment, it is possible to correct the rolling shutter distortion properly while the live view image is being enlarged through the electronic zooming.

The above embodiments have been described with respect to those examples applied to mirrorless single-lens reflex digital cameras, the present invention is applicable to other types of interchangeable lens digital cameras, such as a single-lens reflex digital camera. Besides that, the above embodiments may be implemented not only independently, but some of these may be implemented in combination.

Although the present invention has been fully described by the way of the preferred embodiments thereof with reference to the accompanying drawings, various changes and modifications will be apparent to those skilled in the art. Therefore, unless these changes and modifications depart from the scope of the present invention, they should be construed as included therein.

What is claimed is:

1. An interchangeable lens digital camera comprising an interchangeable lens, a camera body, to which the interchangeable lens is detachably attachable, and communication units which are electrically connected by attaching the interchangeable lens to the camera body, enabling communication between the interchangeable lens and the camera body, wherein, A) the interchangeable lens comprises:
 a shake detection sensor that detects the direction and amount of a shake of the interchangeable lens;
 a shake compensation device that moves a shake compensation lens located in the light path so as to compensate for the shake on the basis of the direction and amount of the shake; and
 a lens controller that transmits deviation information based on the direction and amount of the shake to the camera body through the communication unit;

B) the camera body comprises:
 an image sensor having a plurality of pixels arranged in a matrix to image a subject and output an image signal;

an image data processor that produces a live view image from the image signal, for displaying the live view image on an image display unit; and
a body controller for controlling the camera body;
C) the communication unit comprises:
a serial communication unit for serial communication of information between the lens controller and the body controller; and
a condition communication unit for communication of condition informing signals, which represent conditions of the interchangeable lens and the camera body, between the lens controller and the body controller,
wherein the lens controller and body controller transmit and receive the deviation information through one of the serial communication unit and the condition communication unit,
wherein the body controller controls the image data processor to selectively execute a first process and a second process, wherein the first process is cropping an image signal for one scanning line after another from a predetermined cropping range, the scanning line being a row of the pixels in the matrix, and the second process is determining a corrected cropping range on the basis of the deviation information and cropping an image signal for one scanning line after another from the corrected cropping range, and
wherein the lens controller transmits mode information indicating whether the shake compensation device is active or inactive to the body controller through the serial communication unit, and the body controller controls the image data processor to execute the first process when the shake compensation device is active, or controls the image data processor to execute the second process when the shake compensation device is inactive.

2. The interchangeable lens digital camera of claim 1, wherein the body controller controls the image data processor to execute the first process while an imaging preparation instructing section is being operated, and controls the image data processor to execute the second process when the operation on the imaging preparation instructing section is released.

3. The interchangeable lens digital camera of claim 1, wherein the body controller controls the image data processor to execute the second process before a resizing process for adjusting the resolution of the live view image to the resolution of the image display unit.

4. The interchangeable lens digital camera of claim 1, wherein the body controller controls the image data processor to execute the second process after a resizing process for adjusting the resolution of the live view image to the resolution of the image display unit.

5. The interchangeable lens digital camera of claim 1, wherein the body controller compares the number of scanning lines before a resizing process for adjusting the resolution of the live view image to the resolution of the image display unit with an estimated number of scanning lines of a live view image after the resizing process, so as to control the image data processor to execute the second process on one live view image that has less scanning lines between the live view images before and after the resizing process.

6. The interchangeable lens digital camera of claim 1, wherein, when displaying an image part in a first zooming zone in an enlarged size, the first zooming zone being determined on the live view image, the image data processor determines a second zooming zone that is extended from the first zooming zone by adding a necessary area for the second process to the periphery of the first zooming zone, executes the second process using image signals in the second zooming zone, and crops an image part in the first zooming zone of an image which is undergone the second process, to enlarge and display the cropped image part as the live view image.

7. The interchangeable lens digital camera of claim 1, wherein the lens controller determines whether or not the amount of the shake exceeds a shake compensation limit of the shake compensation device, and transmits the determination result on the shake compensation limit to the body controller; and
the body controller refers to the determination result on the shake compensation limit when the shake compensation device is active, and controls the image data processor to execute the first process if the amount of the shake does not exceed the shake compensation limit, or controls the image data processor to execute the second process if the amount of the shake exceeds the shake compensation limit.

8. The interchangeable lens digital camera of claim 7, wherein the lens controller determines on the basis of the deviation information whether the panning is carried out or not, and transmits a determination result on the panning to the body controller; and
the body controller further refers to the determination result on the panning if the shake amount does not exceed the shake compensation limit, and controls the image data processor to execute the first process if the determination result is that the panning is not carried out, or controls the image data processor to execute the second process if the determination result is that the panning is carried out.

9. The interchangeable lens digital camera of claim 1, wherein the lens controller converts the deviation information corresponding to each scanning line to the condition informing signal, the scanning line being a row of the pixels in the matrix, and transmits the condition information signal for each scanning line to the body controller through the condition communication unit.

10. The interchangeable lens digital camera of claim 9, wherein the condition communication unit is an analog communication unit that serves an analog signal as the condition informing signal, wherein the lens controller converts the deviation information to an analog signal and transmits the analog signal to the body controller.

11. The interchangeable lens digital camera of claim 9, wherein the condition communication unit is a pulse width modulation communication unit that serves a pulse width modulation signal as the condition informing signal, and the lens controller modifies the duty ratio of the pulse width modulation signal according to the deviation information and transmits the pulse width modulation signal to the body controller.

12. An interchangeable lens digital camera comprising an interchangeable lens, a camera body, to which the interchangeable lens is detachably attachable, and communication units which are electrically connected by attaching the interchangeable lens to the camera body, enabling communication between the interchangeable lens and the camera body, wherein,
A) the interchangeable lens comprises:
a shake detection sensor that detects the direction and amount of a shake of the interchangeable lens;

a shake compensation device that moves a shake compensation lens located in the light path so as to compensate for the shake on the basis of the direction and amount of the shake; and a lens controller that transmits deviation information based on the direction and amount of the shake to the camera body through the communication unit;

B) the camera body comprises:

an image sensor having a plurality of pixels arranged in a matrix to image a subject and output an image signal;

an image data processor that produces a live view image from the image signal, for displaying the live view image on an image display unit; and a body controller for controlling the camera body;

C) the communication unit comprises:

a serial communication unit for serial communication of information between the lens controller and the body controller; and a condition communication unit for communication of condition informing signals, which represent conditions of the interchangeable lens and the camera body, between the lens controller and the body controller, wherein the lens controller and body controller transmit and receive the deviation information through one of the serial communication unit and the condition communication unit, wherein the body controller controls the image data processor to selectively execute a first process and a second process, wherein the first process is cropping an image signal for one scanning line after another from a predetermined cropping range, the scanning line being a row of the pixels in the matrix, and the second process is determining a corrected cropping range on the basis of the deviation information and cropping an image signal for one scanning line after another from the corrected cropping range, and wherein, when executing electronic zooming for displaying a part of an live view image in an enlarged size, the body controller compares a designated magnification of the electronic zooming with a prescribed magnification that is predetermined to require the second process, and controls the image data processor to execute the first process when the designated magnification is less than the prescribed magnification, or controls the image data processor to execute the second process when the designated magnification is not less than the prescribed magnification.

13. An interchangeable lens digital camera comprising an interchangeable lens, a camera body, to which the interchangeable lens is detachably attachable, and communication units which are electrically connected by attaching the interchangeable lens to the camera body, enabling communication between the interchangeable lens and the camera body, wherein, A) the interchangeable lens comprises:

a shake detection sensor that detects the direction and amount of a shake of the interchangeable lens;

a shake compensation device that moves a shake compensation lens located in the light path so as to compensate for the shake on the basis of the direction and amount of the shake; and a lens controller that transmits deviation information based on the direction and amount of the shake to the camera body through the communication unit;

B) the camera body comprises:

an image sensor having a plurality of pixels arranged in a matrix to image a subject and output an image signal;

an image data processor that produces a live view image from the image signal, for displaying the live view image on an image display unit; and a body controller for controlling the camera body;

C) the communication unit comprises:

a serial communication unit for serial communication of information between the lens controller and the body controller; and a condition communication unit for communication of condition informing signals, which represent conditions of the interchangeable lens and the camera body, between the lens controller and the body controller, wherein the lens controller and body controller transmit and receive the deviation information through one of the serial communication unit and the condition communication unit, wherein the body controller controls the image data processor to selectively execute a first process and a second process, wherein the first process is cropping an image signal for one scanning line after another from a predetermined cropping range, the scanning line being a row of the pixels in the matrix, and the second process is determining a corrected cropping range on the basis of the deviation information and cropping an image signal for one scanning line after another from the corrected cropping range, and wherein the body controller compares an actual frame rate of the image sensor with a prescribed frame rate that is predetermined to require the second process, and controls the image data processor to execute the first process when the actual frame rate is higher than the prescribed frame rate, or controls the image data processor to execute the second process when the actual frame rate is not higher than the prescribed frame rate.

* * * * *